United States Patent
Nagata et al.

(10) Patent No.: US 10,883,022 B2
(45) Date of Patent: Jan. 5, 2021

(54) PRESSURE-SENSITIVE ADHESIVE COMPOSITION FOR OPTICAL FILM, PRESSURE-SENSITIVE ADHESIVE LAYER FOR OPTICAL FILM, PRESSURE-SENSITIVE ADHESIVE LAYER-ATTACHED OPTICAL FILM, LIQUID CRYSTAL DISPLAY DEVICE, AND LAMINATE

(71) Applicant: NITTO DENKO CORPORATION, Ibaraki (JP)

(72) Inventors: Mizuho Nagata, Ibaraki (JP); Toshitaka Takahashi, Ibaraki (JP); Yousuke Makihata, Ibaraki (JP); Kayo Shimokawa, Ibaraki (JP); Kenichi Okada, Ibaraki (JP); Toshitsugu Hosokawa, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 242 days.

(21) Appl. No.: 14/895,115

(22) PCT Filed: Jun. 24, 2014

(86) PCT No.: PCT/JP2014/066699
§ 371 (c)(1),
(2) Date: Dec. 1, 2015

(87) PCT Pub. No.: WO2014/208550
PCT Pub. Date: Dec. 31, 2014

(65) Prior Publication Data
US 2016/0130478 A1    May 12, 2016

(30) Foreign Application Priority Data

Jun. 28, 2013 (JP) ................................. 2013-137025
May 23, 2014 (JP) ................................. 2014-107237

(51) Int. Cl.
*C09J 11/06* (2006.01)
*C09J 7/22* (2018.01)
(Continued)

(52) U.S. Cl.
CPC ............. *C09J 11/06* (2013.01); *C08F 220/18* (2013.01); *C09J 7/22* (2018.01); *C09J 7/38* (2018.01);
(Continued)

(58) Field of Classification Search
CPC ....... C09J 11/06; C09J 7/22; C09J 7/38; C09J 143/04; C09J 143/02; C09J 133/12;
(Continued)

(56) References Cited

U.S. PATENT DOCUMENTS

2005/0197450 A1    9/2005 Amano et al.
2006/0177651 A1*   8/2006 Tomita .............. C08G 18/6229
                                                           428/343
(Continued)

FOREIGN PATENT DOCUMENTS

CN    101103085 A    1/2008
CN    101298542 A    11/2008
(Continued)

OTHER PUBLICATIONS

International Search Report dated Sep. 30, 2014, issued in counterpart International Application No. PCT/JP2014/066699 (2 pages).
(Continued)

*Primary Examiner* — Eli D. Strah
(74) *Attorney, Agent, or Firm* — Westerman, Hattori, Daniels & Adrian, LLP

(57) ABSTRACT

A pressure-sensitive adhesive composition for an optical film, includes a (meth)acryl-based polymer obtained by polymerization of a monomer component including, as a main component, an alkyl (meth)acrylate having an alkyl
(Continued)

group of 4 to 18 carbon atoms; and a phosphate ester compound. The pressure-sensitive adhesive composition is capable of forming a pressure-sensitive adhesive layer for optical films. The pressure-sensitive adhesive layer that is for use on optical films and makes it possible to suppress an increase in the surface resistance of a transparent conductive layer even when a laminate including a transparent conductive layer and an optical film such as a polarizing plate with the pressure-sensitive adhesive layer interposed therebetween is stored under hot and humid conditions.

4 Claims, 1 Drawing Sheet

(51) Int. Cl.
| | |
|---|---|
| G02B 5/30 | (2006.01) |
| C09J 133/06 | (2006.01) |
| C08F 220/18 | (2006.01) |
| C09J 7/38 | (2018.01) |
| C09J 133/04 | (2006.01) |
| C09J 143/04 | (2006.01) |
| C09J 9/00 | (2006.01) |
| C09J 133/12 | (2006.01) |
| C09J 143/02 | (2006.01) |
| G02F 1/1335 | (2006.01) |
| C08K 5/521 | (2006.01) |
| G02B 1/14 | (2015.01) |

(52) U.S. Cl.
CPC .............. *C09J 9/00* (2013.01); *C09J 133/04* (2013.01); *C09J 133/06* (2013.01); *C09J 133/12* (2013.01); *C09J 143/02* (2013.01); *C09J 143/04* (2013.01); *G02B 5/305* (2013.01); *G02B 5/3033* (2013.01); *G02F 1/133528* (2013.01); *B32B 2457/202* (2013.01); *C08K 5/521* (2013.01); *C09J 2203/318* (2013.01); *C09J 2301/408* (2020.08); *C09J 2433/00* (2013.01); *C09K 2323/03* (2020.08); *C09K 2323/031* (2020.08); *C09K 2323/035* (2020.08); *C09K 2323/05* (2020.08); *C09K 2323/057* (2020.08); *G02B 1/14* (2015.01); *G02F 2202/22* (2013.01); *G02F 2202/28* (2013.01)

(58) Field of Classification Search
CPC . C09J 133/06; C09J 133/04; C09J 9/00; C09J 2205/102; C09J 2203/318; C09J 2433/00; C08F 220/18; C08K 5/521; G02B 5/3033; G02B 5/305; G02B 1/14; G02F 1/133528; B32B 2457/202; Y10T 428/1036; Y10T 428/1041; Y10T 428/105; Y10T 428/1059; Y10T 428/1077
See application file for complete search history.

(56) References Cited

U.S. PATENT DOCUMENTS

| | | | |
|---|---|---|---|
| 2008/0281038 A1* | 11/2008 | Takahashi | C09J 4/00 524/602 |
| 2009/0042004 A1 | 2/2009 | Yano et al. | |
| 2009/0104450 A1 | 4/2009 | Inoue et al. | |
| 2009/0270557 A1 | 10/2009 | Tomita et al. | |
| 2010/0165262 A1 | 7/2010 | Nagase et al. | |
| 2011/0123799 A1 | 5/2011 | Yasui et al. | |
| 2011/0315306 A1 | 12/2011 | Goto et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1 | 3/2012 | Kitagawa et al. | |
| 2012/0058321 A1 | 3/2012 | Goto et al. | |
| 2012/0244328 A1 | 9/2012 | Tanimura et al. | |
| 2012/0327512 A1 | 12/2012 | Goto et al. | |
| 2013/0093438 A1* | 4/2013 | Hosokawa | B32B 7/06 324/661 |
| 2013/0211028 A1 | 8/2013 | Shinike et al. | |
| 2013/0295383 A1 | 11/2013 | Kim et al. | |
| 2014/0085722 A1 | 3/2014 | Yasui et al. | |
| 2014/0158300 A1 | 6/2014 | Hayata et al. | |
| 2015/0353787 A1 | 12/2015 | Nagata et al. | |
| 2016/0130478 A1 | 5/2016 | Nagata et al. | |

FOREIGN PATENT DOCUMENTS

| | | | |
|---|---|---|---|
| CN | 101418198 A | 4/2009 | |
| CN | 101679819 A | 3/2010 | |
| CN | 102070993 A | 5/2011 | |
| CN | 102277099 A | 12/2011 | |
| CN | 104781363 A | 7/2015 | |
| JP | 51-069644 A | 6/1976 | |
| JP | 61-146898 A | 7/1986 | |
| JP | 5-93175 A | 4/1993 | |
| JP | 5-156473 A | 6/1993 | |
| JP | 8-41271 A | 2/1996 | |
| JP | 2000-338329 A | 12/2000 | |
| JP | 2006-249191 A | 9/2006 | |
| JP | 2007-2111 A | 1/2007 | |
| JP | 2007002111 A * | 1/2007 | |
| JP | 2008-189838 A | 8/2008 | |
| JP | 2009-203392 A | 9/2009 | |
| JP | 2010-248465 A | 11/2010 | |
| JP | 2011-21103 A | 2/2011 | |
| JP | 2011-81810 A | 4/2011 | |
| JP | 2010/100917 A1 | 8/2011 | |
| JP | 4751481 B1 | 8/2011 | |
| JP | 2012-31295 A | 2/2012 | |
| JP | WO 2012014814 A1 * | 2/2012 | ............... B32B 7/06 |
| JP | 2012-41456 A | 3/2012 | |
| JP | 2012-073563 A | 4/2012 | |
| JP | 2012-92184 A | 5/2012 | |
| JP | 2012-167188 A | 9/2012 | |
| JP | 2012167188 A * | 9/2012 | ............ C09J 133/06 |
| JP | 2013-1733 A | 1/2013 | |
| JP | 2013-8019 A | 1/2013 | |
| JP | 2013-54516 A | 3/2013 | |
| KR | 10-2008-0049124 A | 6/2008 | |
| KR | 10-2011-0039182 A | 4/2011 | |
| TW | 201311853 A1 | 3/2013 | |
| WO | 2006/028130 A1 | 3/2006 | |
| WO | 2006/086628 A1 | 8/2006 | |
| WO | 2007/058277 A1 | 5/2007 | |
| WO | 2008/142938 A1 | 11/2008 | |
| WO | 2011/001836 A1 | 1/2011 | |
| WO | 2011/068102 A1 | 6/2011 | |
| WO | 2012/091283 A2 | 7/2012 | |
| WO | 2014/103952 A1 | 7/2014 | |
| WO | 2014/208550 A1 | 12/2014 | |

OTHER PUBLICATIONS

Notification of Transmittal of Translation of the International Preliminary Report on Patentability (Form PCT/IB/338) dated Jan. 7, 2016, with Form PCT/IB/373 and Form PCT/ISA/237, issued in counterpart International Application No. PCT/JP2014/066699 (9 pages).

Office Action dated Dec. 8, 2016, issued in counterpart Chinese Application No. 201480036189.8, with English translation. (14 pages).

(56) References Cited

OTHER PUBLICATIONS

Office Action dated Dec. 30, 2016, issued in counterpart Chinese Application No. 201480036273.X, with English translation. (18 pages).
Office Action dated Jan. 24, 2017, issued in counterpart Chinese Patent Application No. 201480036263.6, with English translation. (18 pages).
Office Action dated Sep. 7, 2017, issued in counterpart Taiwanese Application No. 103122407, with English translation. (11 pages).
Office Action dated Sep. 7, 2017, issued in counterpart Taiwanese Application No. 103122408, with English translation. (13 pages).
Office Action dated Sep. 7, 2017, issued in counterpart Taiwanese Application No. 103122410, with English translation. (11 pages).
Office Action dated Oct. 16, 2017, issued in counterpart Chinese Application No. 201480036189.8, with English translation (11 pages).
Office Action dated Oct. 24, 2017, issued in counterpart Chinese Application No. 201480036273.X, with English translation (11 pages).
Office Action dated Nov. 1, 2017, issued in counterpart Chinese Application No. 201480036271.0, with English translation (22 pages).
Office Action dated Nov. 16, 2017, issued in counterpart Chinese Application No. 201480036263.6, with English translation (13 pages).
Office Action dated Mar. 8, 2018, issued in counterpart Taiwanese Application No. 103122415, with English translation. (11 pages).
Office Action dated Jun. 29, 2018, issued in counterpart Japanese Application No. 2014-107237, with English machine translation. (6 pages).
Office Action dated Jul. 13, 2018, issued in counterpart Chinese Application No. 201480036273.X, with English translation. (10 pages).
Office Action dated Jul. 10, 2018, issued in counterpart Taiwanese Application No. 103122407, with English translation. (5 pages).
Office Action dated Jul. 10, 2018, issued in counterpart Taiwanese Application No. 103122408, with English translation. (11 pages).
Office Action dated Jun. 22, 2018, issued in counterpart Japanese Application No. 2014-130742, with English machine translation. (15 pages).
Office Action dated Jun. 22, 2018, issued in counterpart Japanese Application No. 2014-130740, with English machine translation. (5 pages).
Office Action dated Apr. 18, 2018, issued in counterpart Japanese Application No. 2014-107237, with English machine translation. (7 pages).
Office Action dated Apr. 24, 2018, issued in counterpart Japanese Application No. 2014-130735, with English machine translation. (6 pages).
Office Action dated Dec. 25, 2018, issued in counterpart Taiwanese Application No. 103122415, with English translation. (7 pages).
Office Action dated Jan. 8, 2019, issued in counterpart Japanese Application No. 2014-130735, with English machine translation. (7 pages).
Office Action dated Sep. 5, 2018, issued in counterpart Japanese Application No. 2014-130735, with English machine translation. (7 pages).
Office Action dated Mar. 20, 2019, issued in counterpart CN Application No. 201480036273.X, with English translation. (13 pages).
Office Action dated Jul. 10, 2019, issued in counteprart TW Application No. 103122407, with English translation (10 pages).
Office Action dated Jul. 8, 2020, issued in counterpart KR Application No. 10-2015-7035700, with English Translation. (8 pages).
Office Action dated Jul. 28, 2020, issued in counterpart KR Application No. 10-2016-7001781, with English translation (9 pages).
Office Action dated Aug. 27, 2020, issued in counterpart KR Application No. 10-2015-7032116, with English Translation (9 pages).
Office Action dated Aug. 31, 2020, issued in counterpart KR Application No. 10-2015-7036429, with English Translation (10 pages).

* cited by examiner

PRESSURE-SENSITIVE ADHESIVE COMPOSITION FOR OPTICAL FILM, PRESSURE-SENSITIVE ADHESIVE LAYER FOR OPTICAL FILM, PRESSURE-SENSITIVE ADHESIVE LAYER-ATTACHED OPTICAL FILM, LIQUID CRYSTAL DISPLAY DEVICE, AND LAMINATE

TECHNICAL FIELD

The invention relates to a pressure-sensitive adhesive composition for an optical film, a pressure-sensitive adhesive layer for an optical film, a pressure-sensitive adhesive layer-attached optical film, a liquid crystal display device, and a laminate.

BACKGROUND ART

Recently, a transparent conductive laminate including a transparent substrate made of a transparent resin film or a glass plate and a transparent conductive layer such as an indium tin oxide (ITO) thin coating formed on one surface of the transparent substrate is widely used in a variety of applications.

For example, it is known that the transparent conductive layer is formed as an antistatic layer on one side of the transparent substrate of a liquid crystal cell opposite to its side in contact with its liquid crystal layer in a liquid crystal display device where the liquid crystal cell is of an in-plane switching (IPS) type or the like. It is also known that a transparent conductive film having the transparent conductive layer formed on a transparent resin film is used as an electrode substrate for touch panels. In some applications, a polarizing plate is formed on the transparent conductive layer with a pressure-sensitive adhesive layer interposed therebetween.

There are a variety of known pressure-sensitive adhesives for use on optical members, such as antistatic acrylic pressure-sensitive adhesives containing an acryl-based copolymer having a hydroxyl group and an alkylene oxide chain in its side chain, an ionic compound, a curing agent, and a phosphate ester compound (see, for example, Patent Document 1). Patent Document 1 states that the disclosed pressure-sensitive adhesive is suitable for use in surface-protective, pressure-sensitive adhesive films for optical members such as polarizing plates.

PRIOR ART DOCUMENT

Patent Document

Patent Document 1: JP-A-2007-2111

SUMMARY OF THE INVENTION

Problems to be Solved by the Invention

As mentioned above, in some applications, a polarizing plate is placed on the transparent conductive layer with a pressure-sensitive adhesive layer interposed therebetween. In a wide range of applications, such a polarizing plate is an iodine-based polarizing plate, which is manufactured by a process including allowing an unoriented polyvinyl alcohol film to swell in a swelling bath, then adsorbing iodine to the film, subjecting the film to additional processes such as crosslinking and stretching in a boric acid-containing aqueous solution to form a polarizer, and bonding a transparent protective film to at least one surface of the polarizer. Unfortunately, when such an iodine-based polarizing plate is laminated onto a transparent conductive layer such as an ITO thin coating with a pressure-sensitive adhesive interposed therebetween, a problem may occur in which the surface resistance of the transparent conductive layer will increase when the laminate is stored under hot and humid conditions.

This problem is considered to occur because iodine can migrate from the polarizer onto the transparent conductive layer to cause corrosion of the transparent conductive layer. This phenomenon is remarkable when no transparent protective film is provided on one side of the polarizer so that the transparent conductive layer is in contact with the pressure-sensitive adhesive layer on the polarizer constituting the polarizing plate or when a transparent protective film, if any, has a small thickness (e.g., 50 μm or less).

Patent Document 1 teaches nothing about the surface resistance of the transparent conductive layer. The antistatic acrylic pressure-sensitive adhesive described in Patent Document 1 is for use in surface-protective, pressure-sensitive adhesive films and therefore is not enough for use on optical films in view of adhering strength, adhesion reliability, and other properties.

It is therefore an object of the invention to provide a pressure-sensitive adhesive layer that is for use on optical films and makes it possible to suppress an increase in the surface resistance of a transparent conductive layer even when a laminate including the transparent conductive layer and an optical film such as a polarizing plate with the pressure-sensitive adhesive layer interposed therebetween is stored under hot and humid conditions, and to provide a pressure-sensitive adhesive composition that is for use on optical films and capable of forming such a pressure-sensitive adhesive layer for optical films. It is another object of the invention to provide a pressure-sensitive adhesive layer-attached optical film having such a pressure-sensitive adhesive layer provided on one surface of an optical film, to provide a liquid crystal display device having such a pressure-sensitive adhesive layer-attached optical film, and to provide a laminate in which the pressure-sensitive adhesive layer of the pressure-sensitive adhesive layer-attached optical film is bonded to a transparent conductive layer of a transparent conductive film.

Means for Solving the Problems

As a result of intense studies to solve the problems, the inventors have accomplished the invention based on findings that the objects can be achieved with a pressure-sensitive adhesive composition containing a phosphate ester compound.

The invention relates to a pressure-sensitive adhesive composition for an optical film, comprising:

a (meth)acryl-based polymer obtained by polymerization of a monomer component comprising, as a main component, an alkyl (meth)acrylate having an alkyl group of 4 to 18 carbon atoms; and a phosphate ester compound.

The pressure-sensitive adhesive composition for an optical film of the invention preferably comprises 0.005 to 2 parts by weight of the phosphate ester compound based on 100 parts by weight of the total amount of the monomer component used to form the (meth)acryl-based polymer.

In the pressure-sensitive adhesive composition for an optical film of the invention, the monomer component preferably further comprises a phosphate group-containing monomer.

In the pressure-sensitive adhesive composition for an optical film of the invention, the content of the phosphate group-containing monomer is preferably from 0.1 to 10 parts by weight based on 100 parts by weight of the total amount of the monomer component used to form the (meth) acryl-based polymer.

The invention relates to a pressure-sensitive adhesive layer for an optical film made from the pressure-sensitive adhesive composition for an optical film of the invention. The invention relates to a pressure-sensitive adhesive layer-attached optical film comprising:

an optical film; and the pressure-sensitive adhesive layer for an optical film provided on at least one surface of the optical film.

In the pressure-sensitive adhesive layer-attached optical film of the invention, the optical film is preferably a polarizing plate comprising a polarizer and protective films provided on both surfaces of the polarizer, wherein at least one of the protective films has a thickness of 50 μm or less, and the pressure-sensitive adhesive layer is in contact with said at least one of the protective films.

In the pressure-sensitive adhesive layer-attached optical film of the invention, the optical film is preferably a polarizing plate comprising a polarizer and a protective film provided on one surface of the polarizer, and the pressure-sensitive adhesive layer is in contact with at least another surface of the polarizer, on which the protective film is not provided.

The invention relates to a liquid crystal display device comprising the pressure-sensitive adhesive layer-attached optical film of the invention.

The invention relates to a laminate comprising:

the pressure-sensitive adhesive layer-attached optical film of the invention; and a transparent conductive film having a transparent conductive layer, wherein the transparent conductive layer of the transparent conductive film is bonded to the pressure-sensitive adhesive layer of the pressure-sensitive adhesive layer-attached optical film.

Effect of the Invention

The pressure-sensitive adhesive layer of the invention for an optical film is made from the pressure sensitive adhesive composition of the invention for an optical film. When an optical film such as a polarizing plate and a transparent conductive layer are laminated with the pressure-sensitive adhesive layer of the invention interposed therebetween, an increase in the surface resistance of the transparent conductive layer can be suppressed. This would be because the phosphate ester compound in the pressure-sensitive adhesive composition of the invention for an optical film can selectively adsorb onto the surface of a transparent conductive layer to form a coating, which can prevent iodine and other corrosive materials from corroding the transparent conductive layer, so that an increase in the surface resistance can be suppressed.

MODE FOR CARRYING OUT THE INVENTION

Figure 1:
FIG. 1 is a cross-sectional view showing a pressure-sensitive adhesive layer-attached optical film according to the invention.

1. Pressure-Sensitive Adhesive Composition for Optical Film

The pressure-sensitive adhesive composition of the invention for an optical film includes a (meth)acryl-based polymer and a phosphate ester compound, in which the (meth)acryl-based polymer is a product obtained by polymerization of a monomer component including, as a main component, an alkyl (meth)acrylate having an alkyl group of 4 to 18 carbon atoms.

Examples of the phosphate ester compound include a phosphate ester compound represented by formula (1) below and a salt thereof.

[Formula 1]

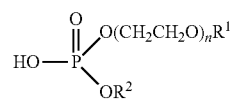

(1)

In the formula, $R^1$ is an alkyl or alkenyl group of 2 to 18 carbon atoms, $R^2$ is a hydrogen atom or $-(CH_2CH_2O)_nR^3$, wherein $R^3$ is an alkyl or alkenyl group of 2 to 18 carbon atoms, and n is an integer of 0 to 15.

$R^1$ is an alkyl or alkenyl group of 2 to 18 carbon atoms, preferably an alkyl group of 2 to 18 carbon atoms, more preferably an alkyl group of 4 to 15 carbon atoms. $R^1$ may be linear or branched and is preferably linear.

$R^2$ is a hydrogen atom or $-(CH_2CH_2O)_nR^3$. Examples of $R^3$ may include those of $R^1$. When $R^2$ is a hydrogen atom, the compound of formula (1) is a monoester. When $R^2$ is $-(CH_2CH_2O)_nR^3$, the compound of formula (1) is a diester. When $R^2$ is $-(CH_2CH_2O)_nR^3$, $R^1$ and $R^3$ may be the same or different.

The letter n represents an integer of 0 to 15, preferably an integer of 0 to 10. In the invention, a mixture of two or more phosphate ester compounds of formula (1) having different $R^1$ moieties may be used, or a mixture of a monoester ($R^2$:H) and a diester ($R^2$:$-(CH_2CH_2O)_nR^3$) may be used. The phosphate ester compound of formula (1) is usually obtained in the form of a mixture of a monoester and a diester.

In the invention, a salt (such as a metal salt such as a sodium, potassium, or magnesium salt, or an ammonium salt) of the phosphate ester compound of formula (1) is also preferably used.

Commercially available products of the phosphate ester compound of formula (1) include MP-4 ($R^1$=$C_4H_9$, $R^2$=H, n=0) and MP-10 ($R^1$=$C_{10}H_{21}$, $R^2$=H, n=0), all manufactured by Daihachi Chemical Industry Co., Ltd.; PHOSPHANOL SM-172 ($R^1$=$R^3$=$C_8H_{17}$, mono-di mixture, n=0), PHOSPHANOL GF-185 ($R^1$=$R^3$=$C_{13}H_{27}$, mono-di mixture, n=0), PHOSPHANOL BH-650=$R^3$=$C_4H_9$, mono-di mixture, n=1), PHOSPHANOL RS-710 ($R^1$=$C_{13}H_{27}$, $R^3$=$C_{13}H_{27}$, mono-di mixture, n=10), PHOSPHANOL ML-220 ($R^1$=$R^3$=$C_{12}H_{25}$, mono-di mixture, n=2), PHOSPHANOL ML-200 ($R^1$=$R^3$=$C_{12}H_{25}$, mono-di mixture, n=0), PHOSPHANOL ED-200 ($R^1$=$R^3$=$C_8H_{17}$, mono-di mixture, n=1), PHOSPHANOL RL-210 ($R^1$=$R^3$=$C_{18}H_{37}$, mono-di mixture, n=2), PHOSPHANOL RS-410 ($R^1$=$R^3$=$C_{13}H_{27}$, mono-di mixture, n=3), PHOSPHANOL GF-339 ($R^1=R^3=C_6H_{13}$ to $C_{10}H_{21}$, mono-di mixture, n=0), PHOSPHANOL GF-199 ($R^1=R^3=C_{12}H_{25}$, mono-di mixture, n=0), and PHOSPHANOL RL-310 ($R^1=R^3=C_{18}H_{37}$, mono-di mixture, n=3), all manufactured by TOHO Chemical Industry Co., Ltd.; NIKKOL DDP-2 (a mixture of $R^1=R^3=C_{12}H_{25}$ to $C_{15}H_{31}$, n=2) manufactured by Nikko Chemicals Co., Ltd.; and salts thereof. The term "mono-di mixture" means a mixture of a monoester ($R^2=H$) and a diester ($R^2=-(CH_2CH_2O)_nR^3$).

According to the invention, an increase in the surface resistance of a transparent conductive layer on an optical film such as a polarizing plate can be suppressed when a pressure-sensitive adhesive layer made from the pressure-sensitive adhesive composition containing the phosphate ester compound is interposed between the transparent conductive layer and the optical film. This would be because the phosphate ester compound in the pressure-sensitive adhesive layer can selectively adsorb on the surface of the transparent conductive layer to form a coating, which can prevent iodine and other materials corrosive to the transparent conductive layer from migrating to the surface of the transparent conductive layer, so that the corrosion of the transparent conductive layer can be prevented. Particularly when the optical film is an iodine-based polarizing plate, this advantageous effect is remarkable.

The phosphate ester compound is preferably added in an amount of 0.005 to 2 parts by weight, more preferably 0.01 to 1.5 parts by weight, even more preferably 0.01 to 1.2 parts by weight, based on 100 parts by weight of the monomer component. Advantageously, when the added amount of the phosphate ester compound falls within the range, an increase in the surface resistance of the transparent conductive layer can be further suppressed.

The (meth)acryl-based polymer used in the invention is obtained by polymerization of a monomer component including, as a main component, an alkyl (meth)acrylate having an alkyl group of 4 to 18 carbon atoms. As used herein, the term "main component" refers to a component in an amount of 50 parts by weight or more, preferably 60 parts by weight or more, more preferably 70 parts by weight or more, even more preferably 80 parts by weight or more, further more preferably 90 parts by weight or more, based on 100 parts by weight of the monomer component used to form the (meth)acryl-based polymer. As used herein, the term "alkyl (meth)acrylate" refers to an alkyl acrylate and/or an alkyl methacrylate, and "(meth)" is used in the same meaning in the description.

The alkyl group of 4 to 18 carbon atoms in the alkyl (meth)acrylate may be any of various straight or branched chain alkyl groups. Examples of the alkyl (meth)acrylate include n-butyl (meth)acrylate, isobutyl (meth)acrylate, sec-butyl (meth)acrylate, tert-butyl (meth)acrylate, n-pentyl (meth)acrylate, isopentyl (meth)acrylate, isoamyl (meth) acrylate, n-hexyl (meth)acrylate, heptyl (meth)acrylate, 2-ethylhexyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth) acrylate, isomyristyl (meth)acrylate, n-tridecyl (meth)acrylate, tetradecyl (meth)acrylate, stearyl (meth)acrylate, Octadecyl (meth)acrylate, dodecyl (meth)acrylate, etc. These may be used alone or in any combination. In particular, n-butyl (meth)acrylate and 2-ethylhexyl (meth)acrylate are preferred, n-butyl (meth)acrylate is particularly preferred.

The monomer component used in the invention preferably contains a phosphate group-containing monomer in view of the effect of suppressing an increase in the surface resistance of the transparent conductive layer. The phosphate group-containing monomer may be any monomer having a phosphate group and an unsaturated double bond-containing polymerizable functional group such as a (meth)acryloyl or vinyl group. For example, the phosphate group-containing monomer may be a phosphate group-containing monomer represented by the following formula (2):

[Formula (2)]

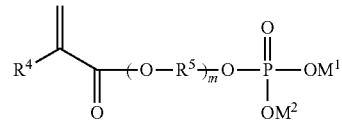

(2)

wherein $R^4$ represents a hydrogen atom or a methyl group, $R^5$ represents an alkylene group of 1 to 4 carbon atoms, m represents an integer of 2 or more, and $M^1$ and $M^2$ each independently represent a hydrogen atom or a cation.

In formula (2), m is an integer of 2 or more, preferably an integer of 4 or more, generally an integer of 40 or less, and m represents the degree of polymerization of the oxyalkylene groups. The polyoxyalkylene group may be a polyoxyethylene group or a polyoxypropylene group, and these polyoxyalkylene groups may comprise random, block, or graft units. The cation of the salt of the phosphate group is typically, but not limited to, an inorganic cation such as an alkali metal such as sodium or potassium or an alkaline-earth metal such as calcium or magnesium, or an organic cation such as a quaternary amine.

The phosphate group-containing monomer is preferably added in an amount of 10 parts by weight or less, more preferably 0.1 to 10 parts by weight, even more preferably 0.1 to 8 parts by weight, still more preferably 0.2 to 5 parts by weight, based on 100 parts by weight of the total amount of the monomer component used to form the (meth)acryl-based polymer. Preferably, when the content of the phosphate group-containing monomer falls within these ranges, an increase in the surface resistance of the transparent conductive layer can be more effectively suppressed.

As mentioned above, in the invention, the use of the phosphate ester compound makes it possible to suppress an increase in the surface resistance of the transparent conductive layer. Additionally, when the monomer component contains the phosphate group-containing monomer, the resulting suppression effect can be more significant. This would be because the phosphate group-containing monomer residue not involved in the polymerization and an oligomer and a polymer made from the monomer component containing the phosphate group-containing monomer can also adsorb on the surface of the transparent conductive layer to form a coating, like the phosphate ester compound. In contrast to the invention, however, only the addition of the phosphate group-containing monomer cannot produce a sufficient suppression effect.

The monomer component used in the invention may contain a carboxyl group-containing monomer. Any monomer having a carboxyl group and an unsaturated double bond-containing polymerizable functional group such as a (meth)acryloyl group or a vinyl group may be used without restriction as the carboxyl group-containing monomer. Examples of the carboxyl group-containing monomer include acrylic acid, methacrylic acid, carboxyethyl (meth) acrylate, carboxypentyl (meth)acrylate, itaconic acid, maleic acid, fumaric acid, and crotonic acid. These may be used alone or in any combination. Among these, acrylic acid and methacrylic acid are preferred, and acrylic acid is particularly preferred.

The carboxyl group-containing monomer is preferably used in an amount of 0 to 10 parts by weight, more preferably 0 to 8 parts by weight, even more preferably 0 to 6 parts by weight, based on 100 parts by weight of the total amount of the monomer component used to form the (meth)acryl-based polymer. In the invention, no addition of the carboxyl group-containing monomer is more preferred because the carboxyl group-containing monomer can be a cause of the corrosion.

The (meth)acryl-based polymer used in the invention is obtained by polymerization of a monomer component including, as a main component, the alkyl (meth)acrylate having an alkyl group of 4 to 18 carbon atoms and optionally including the phosphate group-containing and a carboxyl group-containing monomer. In addition to the alkyl (meth)acrylate having an alkyl group of 4 to 18 carbon atoms and the phosphate group-containing monomer, the monomer component may further include a carboxyl group-containing monomer or any other monomer copolymerizable with the above monomers.

The copolymerizable monomer may be of any type having an unsaturated double bond-containing polymerizable functional group such as a (meth)acryloyl group or a vinyl group, examples of which include an alkyl (meth)acrylate having an alkyl group of 1 to 3 carbon atoms or 19 or more carbon atoms; alicyclic hydrocarbon esters of (meth)acrylic acid, such as cyclohexyl (meth)acrylate, bornyl (meth)acrylate, and isobornyl (meth)acrylate; aryl (meth)acrylate such as phenyl (meth)acrylate; vinyl esters such as vinyl acetate and vinyl propionate; styrene monomers such as styrene; epoxy group-containing monomers such as glycidyl (meth)acrylate and methylglycidyl (meth)acrylate; hydroxyl group-containing monomers such as 2-hydroxyethyl acrylate and 2-hydroxypropyl acrylate; nitrogen atom-containing monomers such as (meth)acrylamide, N,N-dimethyl(meth)acrylamide, N,N-diethyl(meth)acrylamide, N-isopropyl (meth)acrylamide, N-butyl(meth)acrylamide, N-methylol (meth)acrylamide, N-methylolpropane(meth)acrylamide, (meth)acryloylmorpholine, aminoethyl(meth)acrylate, N,N-dimethylaminoethyl (meth)acrylate, and tert-butylaminoethyl (meth)acrylate; alkoxy group-containing monomers such as methoxyethyl (meth)acrylate and ethoxyethyl (meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ether monomers such as vinyl ether; halogen atom-containing monomers such as vinyl chloride; and other monomers including vinyl group-containing heterocyclic compounds such as N-vinylpyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, and N-vinylmorpholine, and N-vinylcarboxylic acid amides.

Examples of the copolymerizable monomer also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid.

Examples of the copolymerizable monomer also include glycol acrylate monomers such as polyethylene glycol (meth)acrylate, polypropylene glycol (meth)acrylate, methoxyethylene glycol (meth)acrylate, and methoxypolypropylene glycol (meth)acrylate; and other monomers such as acrylic ester monomers containing a heterocyclic ring or a halogen atom, such as tetrahydrofurfuryl (meth)acrylate and fluoro(meth)acrylate.

A polyfunctional monomer may also be used as the copolymerizable monomer. The polyfunctional monomer may be a compound having two or more unsaturated double bonds such as those in (meth)acryloyl groups or vinyl groups. Examples that may also be used include (meth)acrylate esters of polyhydric alcohols, such as (mono or poly)alkylene glycol di(meth)acrylates including (mono or poly)ethylene glycol di(meth)acrylates such as ethylene glycol di(meth)acrylate, diethylene glycol di(meth)acrylate, triethylene glycol di(meth)acrylate, trimethylolpropane tri(meth)acrylate, and tetraethylene glycol di(meth)acrylate, (mono or poly)propylene glycol di(meth)acrylate such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; and compounds having a reactive unsaturated double bond, such as allyl (meth)acrylate and vinyl (meth)acrylate. The polyfunctional monomer may also be a compound having a polyester, epoxy or urethane skeleton to which two or more unsaturated double bonds are added in the form of functional groups such as (meth)acryloyl groups or vinyl groups in the same manner as the monomer component, such as polyester (meth)acrylate, epoxy (meth)acrylate, or urethane (meth)acrylate.

The content of the copolymerizable monomer other than the carboxyl group-containing monomer and phosphate group-containing monomer is preferably 40 parts by weight or less, more preferably 30 parts by weight or less, even more preferably 20 parts by weight or less, still more preferably 10 parts by weight or less, based on 100 parts by weight of the total amount of the monomer component used to form the (meth)acryl-based polymer. If the content of the copolymerizable monomer is too high, the pressure-sensitive adhesive layer of the invention made from the pressure-sensitive adhesive composition for an optical film may have degraded pressure-sensitive adhesive properties such as degraded adhesion to various adherends such as glass, films, and transparent conductive layers.

The (meth)acryl-based polymer used in the invention generally has a weight average molecular weight of 500,000 to 3,000,000. In view of durability, specifically, heat resistance, the weight average molecular weight is preferably from 700,000 to 2,700,000, more preferably from 800,000 to 2,500,000. In some cases, a weight average molecular weight of less than 500,000 is not preferred in view of heat resistance. If the weight average molecular weight is more than 3,000,000, a large amount of a dilution solvent for adjusting viscosity can be needed for the application of the composition, which is not preferred for cost reasons. The term "weight average molecular weight" refers to the value calculated as a polystyrene-equivalent molecular weight from a measurement obtained by gel permeation chromatography (GPC). It should be noted that when the pressure-sensitive adhesive is obtained by emulsion polymerization, it generally has a high gel content and cannot be subjected to GPC measurement, which means that it is often difficult to identify the molecular weight by actual measurement.

The (meth)acryl-based polymer described above can be produced, but are not limited to, by any method appropriately selected from known methods such as solution polymerization, bulk polymerization, emulsion polymerization, and various types of radial polymerization. In the invention, the (meth)acryl-based polymer may be, for example, in the form of an aqueous dispersion, which contains the (meth)acryl-based polymer dispersed in water. For example, a polymer emulsion may be used, which is obtained by emulsion polymerization of the monomer component including the alkyl (meth)acrylate having an alkyl group of 4 to 18 carbon atoms, in the presence of the emulsifier and the radical polymerization initiator described below. Alternatively, in the invention, the (meth)acryl-based polymer to be used may be a product obtained by solution polymerization of the monomer component including the (meth)acrylate.

The resulting (meth)acryl-based polymer may be a random copolymer, a block copolymer, a graft copolymer, or any other form.

In a solution polymerization process, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (trade name: VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.005 to 0.5 part by weight, based on 100 parts by total weight of the monomer component used to form the (meth)acryl-based polymer.

For example, when 2,2'-azobisisobutyronitrile is used as the polymerization initiator, the (meth)acryl-based polymer with a weight average molecular weight in the above range is preferably produced using about 0.01 to about 0.2 parts by weight of the polymerization initiator based on 100 parts by weight of the monomer component used to form the (meth)acryl-based polymer.

Examples of the chain transfer agent include lauryl mercaptan, glycidyl mercaptan, mercaptoacetic acid, 2-mercaptoethanol, thioglycolic acid, 2-ethylhexyl thioglycolate and 2,3-dimercapto-1-propanol. One of these chain transfer agents may be used alone, or two or more thereof may be used in a mixture. The total content of the chain transfer agent is preferably about 0.1 parts by weight or less, based on 100 parts by total weight of the monomer component.

When the (meth)acryl-based polymer is prepared by emulsion polymerization, the monomer component described above, the emulsifier described below, and the radical polymerization initiator, and optionally a chain transfer agent or the like may be appropriately mixed in water. More specifically, for example, a known emulsion polymerization method such as a batch mixing method (batch polymerization method), a monomer dropping method, or a monomer emulsion dropping method may be used. In a monomer dropping method, continuous dropping or intermittent dropping is appropriately selected. These methods may be combined as needed. Reaction conditions and other conditions are appropriately selected, in which, for example, the polymerization temperature may be from about 20 to about 90° C.

Examples of the emulsifier include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone or in combination of two or more.

The emulsifier may also be a reactive emulsifier having at least one radically-polymerizable unsaturated double bond per molecule, examples of which include AQUALON HS-10, HS-20, KH-10, BC-05, BC-10, and BC-20 (all manufactured by DKS Co. Ltd.) and ADEKA REASOAP SE-10N (manufactured by ADEKA CORPORATION).

In the invention, a compound represented by formula (3) is preferably used as a reactive emulsifier.

[Formula 3]

$$M^3O_3S\text{—}R^6\text{—}CH\text{=}CH_2 \qquad (3)$$

wherein $R^6$ is a divalent organic group having three or less oxyalkylene repeating units or no oxyalkylene repeating unit and optionally having an oxygen atom, and $M^3$ is Na, K, or $NH_4$, wherein the oxyalkylene repeating unit is a group represented by the following formula:

$$\text{—}(R^7\text{—}O)\text{—}$$

wherein $R^7$ is an alkylene group of 1 to 20 carbon atoms. The reactive emulsifier used in the invention is free of this oxyalkylene repeating unit, or this oxyalkylene repeating unit is repeated three times or less (preferably twice or less) in the reactive emulsifier used in the invention. The divalent organic group may be, but not limited to, a divalent hydrocarbon group optionally having an ether bond or an ester bond.

Examples of such a reactive emulsifier include a compound represented by formula (4):

[Formula 4]

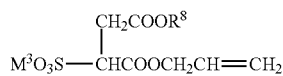
(4)

wherein $M^3$ has the same meaning as defined above, and $R^8$ is an alkyl group of 1 to 20 carbon atoms, and a compound represented by formula (5):

[Formula 5]

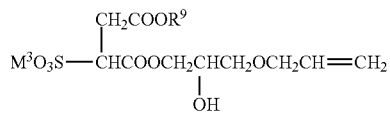
(5)

wherein $M^3$ has the same meaning as defined above, and $R^9$ is an alkyl group of 1 to 20 carbon atoms.

In formulae (3) to (5), $M^3$ is preferably Na, K, or $NH_4$. $R^8$ and $R^9$ are each an alkyl group of 1 to 20 carbon atoms, preferably an alkyl group of 10 to 20 carbon groups.

More specifically, examples of the reactive emulsifier represented by formula (3) include ELEMINOL JS-20 (manufactured by Sanyo Chemical Industries, Ltd.) and LATEMUL S-180A (manufactured by Kao Corporation).

The content of the reactive emulsifier is, for example, preferably 10 parts by weight or less, more preferably from 0.1 to 10 parts by weight, even more preferably from 0.5 to 8 parts by weight, based on 100 parts by weight of the total amount of the monomer component used to form the (meth) acryl-based polymer.

According to the emulsion polymerization described above, the water-dispersible (meth)acryl-based polymer can be prepared in the form of an aqueous dispersion (emulsion). The average particle size of such a water-dispersible (meth) acryl-based polymer is preferably controlled in the range of 0.05 to 3 μm, more preferably in the range of 0.05 to 1 μm.

The pressure-sensitive adhesive composition for the optical film of the invention may contain a water-soluble basic component in addition to the water-dispersible (meth)acryl-based polymer. The water-soluble basic component is a compound capable of forming a salt upon an acid-base neutralization reaction with the carboxyl group of the water-dispersible (meth)acryl-based polymer. In general, the water-soluble basic component is a compound that exhibits alkalinity in an aqueous solution when dissolved in water. Examples of the water-soluble basic component include alkanolamines such as 2-dimethylaminoethanol, diethanolamine, triethanolamine, and aminomethyl propanol; alkylamines such as trimethylamine, triethylamine, and butylamine; polyalkylene polyamines such as ethylenediamine, diethylenetriamine, triethylenetetramine, and tetraethylenepentamine; and other organic amine compounds such as ethyleneimine, polyethyleneimine, imidazole, 2-methylimidazole, pyridine, aniline, and morpholine. Examples of the water-soluble basic component further include inorganic basic compounds such as alkali metal hydroxides including sodium hydroxide and potassium hydroxide; and alkaline-earth metal hydroxides including barium hydroxide, calcium hydroxide, and aluminum hydroxide; and ammonia. Among these, ammonia is preferred in view of the effect of stabilizing the aqueous dispersion by the addition of the water-soluble basic component for the neutralization, the easiness of controlling viscosity to an appropriate level where streaks or unevenness does not occur when the water-dispersible acryl-based pressure-sensitive adhesive is applied, and the balance between the corrosion resistance and the durability of the pressure-sensitive adhesive layer after applying and drying.

A description is given of an example in which ammonia or sodium hydroxide is used as the water-soluble basic component. Ammonia may be used in the form of an ammonia water, and in general, the ammonia water is preferably added in an amount containing about 0.1 to about 20 parts by weight of ammonia, more preferably 0.2 to 5 parts by weight of ammonia, based on 100 parts by weight of the solid in the aqueous dispersion containing the (meth) acryl-based polymer. Sodium hydroxide may be used in the form of an aqueous sodium hydroxide solution, and in general, the aqueous sodium hydroxide solution is preferably added in an amount containing about 0.05 to about 5 parts by weight of sodium hydroxide, more preferably 0.1 to 3 parts by weight of sodium hydroxide, based on 100 parts by weight of the solid in the aqueous dispersion containing the (meth)acryl-based polymer.

To improve adhesion under high-temperature, high-humidity conditions, any of various silane coupling agents may be added to the pressure-sensitive adhesive composition for the optical film of the invention. Silane coupling agents having any appropriate functional group may be used. Examples of such a functional group include vinyl, epoxy, amino, mercapto, (meth)acryloxy, acetoacetyl, isocyanate, styryl, and polysulfide groups. Examples of the silane coupling agent include a vinyl group-containing silane coupling agent such as vinyltriethoxysilane, vinyltripropoxysilane, vinyltriisopropoxysilane, or vinyltributoxysilane; an epoxy group-containing silane coupling agent such as γ-glycidoxypropyltrimethoxysilane, γ-glycidoxypropyltriethoxysilane, 3-glycidoxypropylmethyldiethoxysilane, or 2-(3,4-epoxycyclohexyl)ethyltrimethoxysilane; an amino group-containing silane coupling agent such as γ-aminopropyltrimethoxysilane, N-β-(aminoethyl)-γ-aminopropylmethyldimethoxysilane, N-(2-aminoethyl)3-aminopropylmethyldimethoxysilane, γ-triethoxysilyl-N-(1, 3-dimethylbutylidene)propylamine, or N-phenyl-γ-aminopropyltrimethoxysilane; a mercapto group-containing silane coupling agent such as γ-mercaptopropylmethyldimethoxysilane, a styryl group-containing silane coupling agent such as p-styryltrimethoxysilane; a (meth)acrylic group-containing silane coupling agent such as γ-acryloxypropyltrimethoxysilane or γ-methacryloxypropyltriethoxysilane; an isocyanate group-containing silane coupling agent such as 3-isocyanatepropyltriethoxysilane; and a polysulfide group-containing silane coupling agent such as bis(triethoxysilylpropyl)tetrasulfide.

Among the silane coupling agents, silane coupling agents having a radically polymerizable group copolymerizable with the above monomer component, such as a vinyl group, a (meth)acryloxy group, or a styryl group are preferred, and in view of reactivity, silane coupling agents having a (meth) acryloxy group are particularly preferred. For example, include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth) acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, and 3-(meth)acryloyloxypropyl-propyldiethoxysilane; and (meth)acryloyloxyalkyl-dialkyl (mono)alkoxysilanes corresponding to these monomers.

The silane coupling agents may be used alone or in combination of two or more. Based on 100 parts by weight of the (meth)acryl-based polymer, the total content of the silane coupling agent (s) is preferably 1 part by weight or less, more preferably from 0.01 to 1 part by weight, even more preferably from 0.02 to 0.8 parts by weight, still more preferably from 0.05 to 0.7 parts by weight. If the content of the silane coupling agent is more than 1 part by weight, part of the coupling agent may remain unreacted, which is not preferred in view of durability.

When the silane coupling agent is radically copolymerizable with the above monomer component, it may be used as one of the monomer components. In such a case, the content of the silane coupling agent is preferably from 0.005 to 0.7 parts by weight based on 100 parts by weight of the alkyl (meth)acrylate.

If necessary, the pressure-sensitive adhesive composition for the optical film of the invention may further appropriately contain any of various additives such as viscosity adjusting agent, crosslinking agents, releasing adjusting agent, tackifiers, plasticizers, softener, fillers including glass fibers, glass beads, metal power, or any other inorganic powder, pigments, colorants (pigments, dyes or the likes), pH adjusting agent (acid or base), antioxidants, and ultraviolet ray absorbing agents, without departing from the objects of the invention. These additives may also be added in the form of dispersion.

In particular, a crosslinking agent is preferably used, because it can provide a cohesive strength, which is related to the durability of the pressure-sensitive adhesive. A polyfunctional compound may be used as a crosslinking agent, examples of which include an organic crosslinking agent and a polyfunctional metal chelate. Examples of the organic crosslinking agent include an epoxy crosslinking agent, an isocyanate crosslinking agent, a carbodiimide crosslinking agent, an imine crosslinking agent, an oxazoline crosslinking agent, an aziridine crosslinking agent, etc. The organic crosslinking agent is preferably an isocyanate crosslinking agent. The polyfunctional metal chelate may comprise a polyvalent metal atom and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include an alkyl ester, an alcohol compound, a carboxylic acid compound, an ether compound, and a ketone compound.

The term "isocyanate crosslinking agent" refers to a compound having two or more isocyanate groups (which may include functional groups that are temporarily protected with an isocyanate blocking agent or by oligomerization and are convertible to isocyanate groups) per molecule.

Isocyanate crosslinking agents include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of isocyanate crosslinking agents include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: CORONATE L, manufactured by NIPPON POLYURETHANE INDUSTRY CO., LTD.), a trimethylolpropane-hexamethylene diisocyanate trimer adduct (trade name: CORONATE HL, manufactured by NIPPON POLYURETHANE INDUSTRY CO., LTD.), and an isocyanurate of hexamethylene diisocyanate (trade name: CORONATE HX, manufactured by NIPPON POLYURETHANE INDUSTRY CO., LTD.); a trimethylolpropane adduct of xylylene diisocyanate (trade name: D110N, manufactured by Mitsui Chemicals, Inc.) and a trimethylolpropane adduct of hexamethylene diisocyanate (trade name: D160N, manufactured by Mitsui Chemicals, Inc.); polyether polyisocyanate and polyester polyisocyanate; adducts thereof with various polyols; and polyisocyanates polyfunctionalized with an isocyanurate bond, a biuret bond, an allophanate bond, or the like. In particular, aliphatic isocyanates are preferably used because of their high reaction speed.

The content of the crosslinking agent in the pressure-sensitive adhesive composition for an optical film is generally, but not limited to, about 10 parts by weight or less (on a solid basis), based on 100 parts by weight (on a solid basis) of the (meth)acryl-based polymer. The content of the crosslinking agent is preferably from 0.01 to 10 parts by weight, more preferably from about 0.01 to about 5 parts by weight.

2. Pressure-Sensitive Adhesive Layer for Optical Film

The pressure-sensitive adhesive layer of the invention for an optical film is made from the pressure-sensitive adhesive composition described above for an optical film.

A method for producing the pressure-sensitive adhesive layer of the invention for an optical film may include, but is not limited to, applying, to any substrate, the pressure-sensitive adhesive composition for an optical film; and drying the composition with a drier such as a heating oven to remove solvent, water and any excess of the water-soluble basic component etc. by vaporization, so that the pressure-sensitive adhesive layer is formed. For example, the substrate may be, but is not limited to, a release film, a transparent resin film, or any of various other substrates. The optical film described below is also advantageously used as the substrate.

Any of various methods may be used to apply, to the substrate, the pressure-sensitive adhesive composition for an optical film. Examples include roll coating, kiss roll coating, gravure coating, reverse coating, roll brushing, spray coating, dip roll coating, bar coating, knife coating, air knife coating, curtain coating, lip coating, and extrusion coating with a die coater or the like.

The drying conditions (temperature and time) are not limited and may be appropriately selected depending on the components, concentration, or other features of the pressure-sensitive adhesive composition for an optical film. For example, the drying conditions may be about 80 to about 170° C. and 1 to 60 minutes, preferably 90 to 150° C. and 2 to 30 minutes.

The thickness of the pressure-sensitive adhesive layer (after the drying) is, for example, preferably from 10 to 100 µm, more preferably from 15 to 80 µm, even more preferably from 20 to 60 µm. If the pressure-sensitive adhesive layer has a thickness of less than 10 µm, it may have lower adhesion to the adherend and tend to have insufficient durability in a high-temperature or high-temperature, high-humidity environment. If the pressure-sensitive adhesive layer has a thickness of more than 100 µm, the pressure-sensitive adhesive composition may fail to be sufficiently dried in the process of forming the pressure-sensitive adhesive layer by application and drying, so that air bubbles may remain or thickness irregularities may occur on the surface of the pressure-sensitive adhesive layer, which may easily produce a problem with appearance.

Examples of the material used to form the release film include a resin film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A resin film is preferably used, because of its good surface smoothness.

Examples of the resin film include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from 5 to 200 µm, preferably from about 5 to about 100 µm. If necessary, the release film may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

The transparent resin film substrate to be used may be, but not limited to, various transparent resin films. The resin film is generally formed of a monolayer film. Examples of the material for the transparent resin film substrate include polyester resins such as polyethylene terephthalate and polyethylene naphthalate, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred.

The film substrate preferably has a thickness of 15 to 200 µm, more preferably 25 to 188 µm.

After the pressure-sensitive adhesive layer of the invention is formed on the resin film substrate to form a pressure-sensitive adhesive layer-attached resin film, a transparent conductive layer may be further formed on the side of the resin film substrate opposite to its side in contact with the pressure-sensitive adhesive layer. The resulting product can be used as an electrode for touch panel applications.

3. Pressure-Sensitive Adhesive Layer-Attached Optical Film

The pressure-sensitive adhesive layer-attached optical film of the invention includes an optical film and the pressure-sensitive adhesive layer for an optical film, wherein the pressure-sensitive adhesive layer is formed on at least one surface of the optical film. Even when bonded directly to a transparent conductive layer made of a metal oxide, the pressure-sensitive adhesive layer-attached optical film makes it possible to suppress the corrosion of the transparent conductive layer because it has the pressure-sensitive adhesive layer of the invention.

The pressure-sensitive adhesive layer-attached optical film of the invention will be described in detail with reference to FIG. 1. It will be understood that FIG. 1 shows a non-limiting example of the pressure-sensitive adhesive layer-attached optical film of the invention.

The pressure-sensitive adhesive layer-attached optical film of the invention (see FIG. 1) includes an optical film 1 and a pressure-sensitive adhesive layer 2 for an optical film (hereinafter also referred to as the pressure-sensitive adhesive layer 2), wherein the pressure-sensitive adhesive layer 2 is provided on one surface of the optical film 1.

The optical film 1 used in the pressure-sensitive adhesive layer-attached optical film of the invention may be of any type used in forming image display devices such as liquid crystal display devices. For example, the optical film 1 may be a polarizing plate. The polarizing plate may generally include a polarizer and a transparent protective film or films provided on one or both sides of the polarizer. The invention is remarkably effective when the pressure-sensitive adhesive layer for an optical film is formed in contact with the unprotected surface of a polarizer in a one-side-protected polarizing plate including the polarizer and a transparent protective film provided on only one side of the polarizer. The invention is also remarkably effective when the pressure-sensitive adhesive layer for an optical film is formed in contact with a 50 µm or less-thick protective film constituting a polarizing plate that includes a polarizer and protective films on both sides of the polarizer. When the one-side-protected polarizing plate is used, the pressure-sensitive adhesive layer may be provided directly on the surface of the polarizer where no transparent protective film is provided.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally from about 5 µm to about 80 µm.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions containing boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions containing boric acid and potassium iodide, and in water bath.

In the invention, a thin polarizer with a thickness of 10 µm or less may also be used. In view of thickness reduction, the thickness is preferably from 1 to 7 µm. Such a thin polarizer is less uneven in thickness, has good visibility, and is less dimensionally-variable, and thus has high durability. It is also preferred because it can form a thinner polarizing plate.

Typical examples of the thin type polarizer include thin type polarizing films described in publications of JP-A-51-069644 and JP-A-2000-338329, the pamphlet of WO2010/100917, the specification of Japanese Patent No. 4751481, and the publication of JP-A-2012-073563. These thin type polarizing films can be obtained by a producing method including the step of stretching a polyvinyl alcohol-based resin (hereinafter also referred to as PVA-based resin) layer and a resin substrate for stretching in the state that these are laminated on each other, and the step of dyeing the resultant laminate. According to this producing method, the PVA based resin layer can be stretched without causing inconveniences by the stretching, such as breaking, even when the PVA based resin layer is thin, because the PVA based resin layer is supported by the resin substrate for stretching.

Among thin type polarizing films as described above, which are obtained by the method including the step of stretching in the state of a laminate and the step of dyeing the laminate, preferred is one obtained by a method including a step of stretching such a laminate in an aqueous boric acid solution, as described in the pamphlet of WO 2010/100917, or the specification of Japanese Patent No. 4751481 or the publication of JP-A-2012-073563, since the laminate can be stretched into a high stretching ratio and improved in polarizing performance. Particularly preferred is a polarizing film obtained by the method described in the specification of Japanese Patent No. 4751481 or the publication of JP-A-2012-073563, which includes the step of stretching such a laminate subsidiarily in the air before the laminate is stretched in an aqueous boric acid solution.

The transparent protective film or films on one or both sides of the polarizer are preferably made of a material having a high level of transparency, mechanical strength, thermal stability, water barrier properties, isotropy, and other properties. Examples of such a material include polyester polymers such as polyethylene terephthalate and polyethylene naphthalate, cellulose polymers such as diacetyl cellulose and triacetyl cellulose, acryl-based polymers such as polymethyl methacrylate, styrene polymers such as polystyrene and acrylonitrile-styrene copolymers (AS resins), polycarbonate polymers, etc. Examples of polymers that may be used to form the transparent protective films also include polyolefin polymers such as polyethylene, polypropylene, cyclo- or norbornene-structure-containing polyolefin, and ethylene-propylene copolymers, vinyl chloride polymers, amide polymers such as nylon and aromatic polyamide, imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers, or any blends of the above polymers. The transparent protective film may also be a layer formed by curing a curable resin such as a thermosetting or ultraviolet-curable resin such as an acrylic, urethane, acrylic urethane, epoxy, or silicone resin.

The thickness of the protective film may be determined as appropriate. Generally, the thickness of the protective film is from about 1 to about 500 µm in view of strength, workability such as handleability, and thin film formability. The invention is also sufficiently effective in suppressing an increase in the surface resistance of the transparent conductive layer even when the protective film in contact with the pressure-sensitive adhesive on the optical film is as thin as 50 µm or less.

The polarizer and the protective film are generally bonded with a water-based adhesive or the like interposed therebetween. Examples of the water-based adhesive include isocyanate adhesives, polyvinyl alcohol-based adhesives, gelatin-based adhesives, vinyl-based latex-based adhesives, water-based polyurethane adhesives, and water-based polyester adhesives. Besides the above, ultraviolet-curable adhesives, electron beam-curable adhesives, or the like may also be used to bond the polarizer and the transparent protective film together. Electron beam-curable adhesives for polarizing films have good tackiness to the various transparent protective films described above. The adhesive for use in the invention may also contain a metal compound filler.

The surface of the transparent protective film opposite to its surface to be bonded to the polarizer may have undergone the formation of a hard coat layer, an anti-reflection treatment, an anti-sticking treatment, or a treatment for diffusion or antiglare properties.

Examples of the optical film other than polarizing plates include a reflector, a transflector, a retardation plate (including a wavelength plate such as a half or quarter wavelength plate), a viewing angle compensation film, a brightness enhancement film, and any other optical layer that can be used to forma liquid crystal display device or the like. They may be used alone as the optical film, or one or more layers of any of them may be used together with the polarizing plate to form a laminate for practical use.

The optical film may be subjected to an activation treatment. The activation treatment may be performed using various methods such as a corona treatment, a low-pressure UV treatment, and a plasma treatment.

The pressure-sensitive adhesive layer is formed on the optical film by the method described above.

When the surface of the pressure-sensitive adhesive layer is exposed, the pressure-sensitive adhesive layer may be protected by a release film (separator) until it is actually used. Examples of the release film include those listed above. When a release film is used as the substrate on which the pressure-sensitive adhesive layer is formed, the optical film may be bonded to the pressure-sensitive adhesive layer on the release film, so that the release film can be used as it is for the pressure-sensitive adhesive layer of the pressure-sensitive adhesive layer-attached optical film, which can simplify the process.

An anchor layer (not shown in the drawings) may also be provided between the optical film 1 and the pressure-sensitive adhesive layer 2 for an optical film. Examples of the material used to form the anchor layer include, but are not limited to, various polymers, metal oxide sols, and silica sols. In particular, polymers are preferably used. The polymers to be used may be of any of solvent-soluble, water-dispersible, and water-soluble types.

Examples of the polymers include polyurethane resins, polyester resins, acrylic resins, polyether resins, cellulose resins, polyvinyl alcohol resins, polyvinylpyrrolidone, and polystyrene resins. In particular, polyurethane resins, polyester resins, and acrylic resins are preferred. Any appropriate crosslinking agent may be added to any of these resins. Besides the above, one or more binder components may be appropriately used depending on the intended use.

When the anchor layer is made from a water-dispersible material, a water-dispersible polymer may be used. The water-dispersible polymer may be in the form of an emulsion, which is prepared by emulsifying polyurethane, polyester, or any other resin with an emulsifying agent, or may be a self-emulsified resin prepared by introducing a water-dispersible anionic, cationic, or nonionic group into the resin.

The anchor agent may contain an antistatic agent. The antistatic agent may be of any type as long as it can impart electrical conductivity. Examples thereof include ionic surfactants, conductive polymers, metal oxides, carbon black, and carbon nanomaterials. In particular, conductive polymers are preferred, and water-dispersible conductive polymers are more preferred.

Examples of the water-soluble conductive polymer include polyaniline sulfonic acid (with a polystyrene-equivalent weight average molecular weight of 150,000, manufactured by MITSUBISHI RAYON CO., LTD.) and the like. Examples of the water-dispersible conductive polymer include polythiophene conductive polymers (Denatron series manufactured by Nagase ChemteX Corporation) and the like.

The content of the antistatic agent may be 70 parts by weight or less, preferably 50 parts by weight or less, based on 100 parts by weight of the polymers for use for the anchor agent. In view of the antistatic effect, the content is preferably 10 parts by weight or more, more preferably 20 parts by weight or more.

The thickness of the anchor layer is preferably, but not limited to, 5 to 300 nm.

The anchor layer may be formed by any conventionally known method. When the anchor layer is formed, the optical film may be subjected to an activation treatment. The activation treatment may be performed using various methods such as a corona treatment, a low-pressure UV treatment, and a plasma treatment.

The method described above may be used to form the pressure-sensitive adhesive layer on the anchor layer on the optical film.

Besides the liquid crystal display device applications, the pressure-sensitive adhesive layer-attached optical film of the invention may also be used, for example, in touch panel applications where the pressure-sensitive adhesive layer of the pressure-sensitive adhesive layer-attached optical film is attached to the transparent conductive layer of a transparent conductive film used to form a touch panel electrode substrate.

4. Liquid Crystal Display Device

The pressure-sensitive adhesive layer-attached optical film of the invention is suitable for use in a variety of liquid crystal display devices.

Particularly in some liquid crystal display devices using an IPS liquid crystal cell, a transparent conductive layer is formed as an antistatic layer on the opposite side of the liquid crystal cell from its side in contact with the transparent substrate of the liquid crystal layer. In such liquid crystal display devices, the pressure-sensitive adhesive layer of the pressure-sensitive adhesive layer-attached optical film of the invention may be bonded to the transparent conductive layer, so that the transparent conductive layer as the antistatic layer can be advantageously prevented from corroding.

Figure 2:
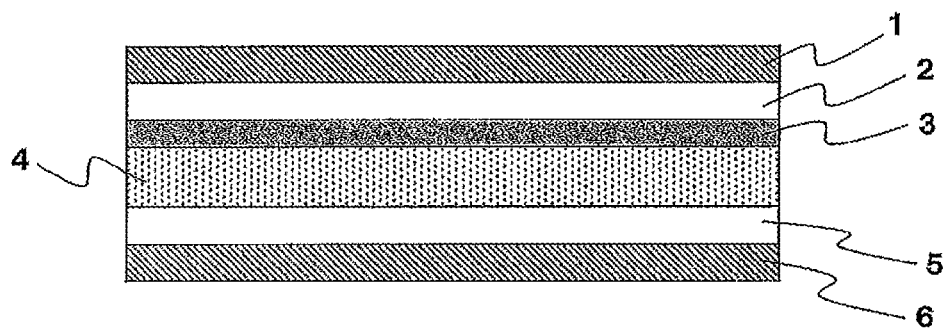
FIG. 2 is a cross-sectional view showing a liquid crystal display device according to the invention.

FIG. 2 shows an example of a liquid crystal display device formed using the pressure-sensitive adhesive layer-attached optical film of the invention. The liquid crystal display device of FIG. 2 includes an optical film 1, a pressure-sensitive adhesive layer 2 for an optical film, a transparent conductive layer 3, a liquid crystal cell 4, a pressure-sensitive adhesive layer 5, and an optical film 6. It will be understood that the liquid crystal display device of the invention is not limited to this type and may include any of various layers suitable for use in the liquid crystal display device with these features.

The optical film 1 and the pressure-sensitive adhesive layer 2 for a transparent conductive layer correspond to the pressure-sensitive adhesive layer-attached optical film. Examples of the optical film 6 may be the same as those of the optical film 1.

The liquid crystal cell may be of any type such as TN type, STN type, n type, VA type, or IPS type. For the reason suggested above, the invention is highly effective particularly when an IPS liquid crystal cell is used.

The pressure-sensitive adhesive layer 5 may be the pressure-sensitive adhesive layer of the invention or any pressure-sensitive adhesive layer commonly used in liquid crystal image display devices. For example, a pressure-sensitive adhesive including an acryl-based polymer, a silicone polymer, polyester, polyurethane, polyether, a fluoropolymer, a synthetic rubber polymer, or the like as a base polymer may be used to form the pressure-sensitive adhesive layer. In particular, an acrylic pressure-sensitive adhesive having a high level of optical transparency, weather resistance, and heat resistance and a suitable level of wettability and adhesive properties such as cohesion and adhesion is preferably used.

The material used to form the transparent conductive layer 3 on the liquid crystal cell is typically, but not limited to, a metal oxide. The metal oxide is preferably indium oxide doped with tin oxide. Such a metal oxide preferably contains 80 to 99% by weight of indium oxide and 1 to 20% by weight of tin oxide.

The thickness of the transparent conductive layer 3 is preferably, but not limited to, 10 nm or more. If the thickness is too large, a reduction in transparency and so on may occur. Therefore, the thickness is preferably from 15 to 35 nm, more preferably from 20 to 30 nm. If the thickness is less than 15 nm, the surface electric resistance may be too high, and it may be difficult to form a continuous coating film. If the thickness is more than 35 nm, a reduction in transparency may occur.

The transparent conductive layer 3 may be formed using known conventional methods, while the methods are not particularly limited. Examples of such methods include vacuum deposition, sputtering, and ion plating. Any appropriate method may be used depending on the required thickness of the layer.

In the process of forming the transparent conductive layer 3, an undercoat layer may also be provided. The undercoat layer may be made of an inorganic material, an organic material, or a mixture of inorganic and organic materials. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses is the refractive index of each material. In particular, $SiO_2$, $MgF_2$, $Al_2O_3$, or the like is preferably used. In particular, $SiO_2$ is preferred. Besides the above, a complex oxide containing about 10 to about 40 parts by weight of cerium oxide and about 0 to about 20 parts by weight of tin oxide based on the indium oxide may also be used.

The undercoat layer made of an inorganic material may be form with a dry process such as vacuum deposition, sputtering or ion plating, a wet process (coating process), or the like. $SiO_2$ is preferably used as the inorganic material to form the undercoat layer as described above. In a wet process, a silica sol or the like may be applied to form a $SiO_2$ film.

Besides the components described above, the liquid crystal display device of the invention may also include any of various layers commonly used in liquid crystal display devices, such as any optical compensation layers and adhesive layers, between the respective layers shown in FIG. 2 and/or on the outside of the layer shown in FIG. 2.

5. Laminate

The laminate of the invention is characterized in that the pressure-sensitive adhesive layer of the pressure-sensitive adhesive layer-attached optical film is bonded to the transparent conductive layer of a transparent conductive film.

The pressure-sensitive adhesive layer-attached optical film described above may be used to form the laminate.

The transparent conductive film to be used may be of any known type. In general, the transparent conductive film used includes a transparent substrate and a transparent conductive layer provided on the substrate.

The transparent substrate may be of any type having transparency. The transparent substrate may be, for example, a resin film or a substrate made of glass or other materials (e.g., a substrate in the form of a sheet, a film, or a plate). In particular, the transparent substrate is preferably a resin film. The thickness of the transparent substrate is preferably, but not limited to, about 10 to about 200 μm, more preferably about 15 to about 150 μm.

Examples of the material used to form the resin film include, but are not limited to, various transparent plastic materials. Examples of such materials include polyester resins such as polyethylene terephthalate and polyethylene naphthalate, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. Among them, polyester resins, polyimide resins, and polyethersulfone resins are particularly preferred.

The surface of the transparent substrate may be previously subject to sputtering, corona discharge treatment, flame treatment, ultraviolet irradiation, electron beam irradiation, chemical treatment, etching treatment such as oxidation, or undercoating treatment such that the adhesion of the transparent conductive layer formed thereon to the transparent substrate can be improved. If necessary, the transparent substrate may also be subjected to dust removing or cleaning by solvent cleaning, ultrasonic cleaning or the like, before the transparent conductive layer is formed.

The transparent conductive layer may be the same as that described in the section "4. Liquid crystal display device."

EXAMPLES

Hereinafter, the invention will be more specifically described with reference to examples, which however are not intended to limit the gist of the invention. In each example, "parts" and "%" are all by weight.

Example 1

(Preparation of Monomer Emulsion)

A vessel was charged with 785 parts of butyl acrylate, 160 parts of methyl methacrylate, 5 parts of a phosphate group-containing monomer (Sipomer PAM-200 (trade name) manufactured by Rhodia Nicca, Ltd.), 1 part of a phosphate group-containing ester (PHOSPHANOL SM-172 (trade name) manufactured by TOHO CHEMICAL INDUSTRY Co., Ltd.), 50 parts of acrylic acid, 0.5 parts of 3-methacryloyloxypropyltriethoxysilane (KBM-503 (trade name) manufactured by Shin-Etsu Chemical Co., Ltd.), 20 parts of ELEMINOL JS-20 (manufactured by Sanyo Chemical Industries, Ltd.), and 1,381 parts of water as raw materials. Using a homomixer (manufactured by PRIMIX Corporation), the raw materials were stirred at 6,000 rpm for 5 minutes to form a monomer emulsion.

(Preparation of Aqueous Dispersion-Type Acrylic Pressure-Sensitive Adhesive)

Subsequently, the monomer emulsion prepared as described above was added to a reaction vessel equipped with a condenser tube, a nitrogen introducing tube, a thermometer, a dropping funnel, and a stirring blade. Subsequently, after the reaction vessel was sufficiently purged with nitrogen, the temperature of the inner bath was adjusted to 65° C. After 0.1 parts of sodium ammonium peroxosulfate (APS) was added to the reaction vessel, the mixture was subjected to polymerization for 5 hours to form an aqueous dispersion (emulsion) with a solid concentration of 40%. An aqueous dispersion-type acrylic pressure-sensitive adhesive was prepared by adding 3 parts of 10% ammonia water to 100 parts by weight of the aqueous dispersion (emulsion).

(Formation of Pressure-Sensitive Adhesive Layer for Optical Film)

The aqueous dispersion-type acrylic pressure-sensitive adhesive was applied to a release film (Diafoil MRF-38 (trade name for a polyethylene terephthalate substrate) manufactured by Mitsubishi Plastics, Inc.) with an applicator so that a 25-μm-thick coating would be formed after drying. The coating was then dried at 135° C. for 2 minutes in a hot air circulating oven to form a pressure-sensitive adhesive layer for an optical film.

(Preparation of Pressure-Sensitive Adhesive Layer-Attached Polarizing Plate)

A laminate including an A-PET (amorphous-polyethylene terephthalate) film (NOVACLEAR SH046 (trade name) manufactured by Mitsubishi Plastics Inc., 200 μm in thickness) and a 9-μm-thick PVA layer formed thereon was subjected to auxiliary in-air stretching at a stretch ratio of 2 times at a stretching temperature of 130° C. to form a stretched laminate. Subsequently, the stretched laminate was subjected to dyeing to form a dyed laminate, and the dyed laminate was subjected to stretching in an aqueous boric acid solution at a stretching temperature of 65° C. to a total stretch ratio of 5.94 times, so that an optical film laminate was obtained, which had a 4-μm-thick PVA layer stretched together with the A-PET film. As a result of such two-stage stretching, an optical film laminate having a 4-μm-thick PVA layer formed on the A-PET film was successfully obtained. In the PVA layer, PVA molecules were highly oriented, and the iodine adsorbed by the dyeing formed a complex with the PVA. The PVA-iodine complex was highly oriented in a single direction to form a highly functional polarizing layer. A 40-μm-thick acrylic film was bonded to the surface of the polarizing layer of the optical film laminate with a polyvinyl alcohol-based adhesive interposed therebetween. Subsequently, the A-PET film was peeled off from the laminate, so that a polarizing plate with the thin polarizing layer was obtained. The product is called a one-side-protected polarizing plate (1).

The pressure-sensitive adhesive layer for an optical film, which was obtained as described above (see "Formation of pressure-sensitive adhesive layer for optical film"), was bonded to the polarizer of the one-side-protected polarizing plate (1) (bonded to the surface on which no protective film was placed), so that a pressure-sensitive adhesive layer-attached polarizing plate was obtained.

Example 2

A pressure-sensitive adhesive layer-attached polarizing plate was prepared as in Example 1, except that in the (Preparation of pressure-sensitive adhesive layer-attached polarizing plate) of Example 1, the double-side-protected polarizing plate (1) shown below was used instead and the pressure-sensitive adhesive layer obtained in the (Formation of pressure-sensitive adhesive layer for optical film) was bonded to the 40-μm-thick protective film of the double-side-protected polarizing plate (1).

(Preparation of Double-Side-Protected Polarizing Plate (1))

A laminate including an A-PET (amorphous-polyethylene terephthalate) film (NOVACLEAR SH046 (trade name) manufactured by Mitsubishi Plastics Inc., 200 μm in thickness) and a 12-μm-thick PVA layer formed thereon was subjected to auxiliary in-air stretching at a stretch ratio of 2 times at a stretching temperature of 130° C. to form a stretched laminate. Subsequently, the stretched laminate was subjected to dyeing to form a dyed laminate, and the dyed laminate was subjected to stretching in an aqueous boric acid solution at a stretching temperature of 65° C. to a total stretch ratio of 5.94 times, so that an optical film laminate was obtained, which had a 5-μm-thick PVA layer stretched together with the A-PET film. As a result of such two-stage stretching, an optical film laminate having a 5-μm-thick PVA layer formed on the A-PET film was successfully obtained. In the PVA layer, PVA molecules were highly oriented, and the iodine adsorbed by the dyeing formed a complex with the PVA. The PVA-iodine complex was highly oriented in a single direction to form a highly functional polarizing layer. A 40-μm-thick acrylic film was bonded to the surface of the polarizing layer of the optical film laminate with a polyvinyl alcohol-based adhesive interposed therebetween. Subsequently, the A-PET film was peeled off from the laminate, so that a one-side-protected polarizing plate (2) with the thin polarizer was obtained. A 25-μm-thick norbornene polymer film (ARTON (trade name) manufactured by JSR Corporation) was bonded to the surface of the polarizer of the prepared one-side-protected polarizing plate (2) with a UV-curable adhesive interposed therebetween, so that a double-side-protected polarizing plate (1) was obtained.

Example 3

A pressure-sensitive adhesive layer-attached polarizing plate was prepared as in Example 1, except that the amount of the phosphate group-containing ester (PHOSPHANOL SM-172 (trade name) manufactured by TOHO CHEMICAL INDUSTRY Co., Ltd.) was changed from 1 part to 10 parts in the (Preparation of monomer emulsion) of Example 1.

Example 4

A pressure-sensitive adhesive layer-attached polarizing plate was prepared as in Example 1, except that the amount of butyl acrylate was changed from 785 parts to 790 parts, the amount of the phosphate group-containing monomer (Sipomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 1 part to 2 parts in the (Preparation of monomer emulsion) of Example 1.

Example 5

A pressure-sensitive adhesive layer-attached polarizing plate was prepared as in Example 1, except that the amount of butyl acrylate was changed from 785 parts to 790 parts, the amount of the phosphate group-containing monomer (Simpomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 1 part to 10 parts in the (Preparation of monomer emulsion) of Example 1.

Example 6

A pressure-sensitive adhesive layer-attached polarizing plate was prepared as in Example 1, except that the amount of butyl acrylate was changed from 785 parts to 770 parts, the amount of the phosphate group-containing monomer (Simpomer PAM-200 (trade name) manufactured by Rhodia Nicca, Ltd.) was changed from 5 parts to 20 parts, and the amount of the phosphate group-containing ester (PHOSPHANOL SM-172 (trade name) manufactured by TOHO CHEMICAL INDUSTRY Co., Ltd.) was changed from 1 part to 0.3 parts in the (Preparation of monomer emulsion) of Example 1.

Example 7

A pressure-sensitive adhesive layer-attached polarizing plate was prepared as in Example 1, except that the amount of butyl acrylate was changed from 785 parts to 770 parts, the amount of the phosphate group-containing monomer (Simpomer PAM-200 (trade name) manufactured by Rhodia Nicca, Ltd.) was changed from 5 parts to 20 parts, and the amount of the phosphate group-containing ester (PHOSPHANOL SM-172 (trade name) manufactured by TOHO CHEMICAL INDUSTRY Co., Ltd.) was changed from 1 part to 10 parts in the (Preparation of monomer emulsion) of Example 1.

Example 8

A pressure-sensitive adhesive layer-attached polarizing plate was prepared as in Example 1, except that the amount of butyl acrylate was changed from 785 parts to 740 parts, the amount of the phosphate group-containing monomer (Simpomer PAM-200 (trade name) manufactured by Rhodia Nicca, Ltd.) was changed from 5 parts to 50 parts in the (Preparation of monomer emulsion) of Example 1.

Example 9

A pressure-sensitive adhesive layer-attached polarizing plate was prepared as in Example 1, except that the amount of butyl acrylate was changed from 785 parts to 780 parts, the amount of the phosphate group-containing monomer (Simpomer PAM-200 (trade name) manufactured by Rhodia Nicca, Ltd.) was changed from 5 parts to 10 parts, and the type of the phosphate group-containing ester was changed from PHOSPHANOL SM-172 (trade name, manufactured by TOHO CHEMICAL INDUSTRY Co., Ltd.) to MP-4 (trade name, manufactured by DAIHACHI CHEMICAL INDUSTRY CO., LTD.) in the (Preparation of monomer emulsion) of Example 1.

Example 10

A pressure-sensitive adhesive layer-attached polarizing plate was prepared as in Example 1, except that the amount of butyl acrylate was changed from 785 parts to 770 parts, the amount of the phosphate group-containing monomer (Simpomer PAM-200 (trade name) manufactured by Rhodia Nicca, Ltd.) was changed from 5 parts to 20 parts, and the type of the phosphate group-containing ester was changed from PHOSPHANOL SM-172 (trade name, manufactured by TOHO CHEMICAL INDUSTRY Co., Ltd.) to MP-4 (trade name, manufactured by DAIHACHI CHEMICAL INDUSTRY CO., LTD.) in the (Preparation of monomer emulsion) of Example 1.

Example 11

A pressure-sensitive adhesive layer-attached polarizing plate was prepared as in Example 1, except that the amount of butyl acrylate was changed from 785 parts to 790 parts, the amount of the phosphate group-containing monomer (Simpomer PAM-200 (trade name) manufactured by Rhodia Nicca, Ltd.) was changed from 5 parts to 0 part, and the type of the phosphate group-containing ester was changed from PHOSPHANOL SM-172 (trade name, manufactured by TOHO CHEMICAL INDUSTRY Co., Ltd.) to PHOSPHANOL GF-185 (trade name, manufactured by TOHO CHEMICAL INDUSTRY Co., Ltd.) in the (Preparation of monomer emulsion) of Example 1.

Example 12

A pressure-sensitive adhesive layer-attached polarizing plate was prepared as in Example 1, except that the amount of butyl acrylate was changed from 785 parts to 780 parts, the amount of the phosphate group-containing monomer (Simpomer PAM-200 (trade name) manufactured by Rhodia Nicca, Ltd.) was changed from 5 parts to 10 parts, and the type of the phosphate group-containing ester was changed from PHOSPHANOL SM-172 (trade name, manufactured by TOHO CHEMICAL INDUSTRY Co., Ltd.) to PHOSPHANOL GF-185 (trade name, manufactured by TOHO CHEMICAL INDUSTRY Co., Ltd.) in the (Preparation of monomer emulsion) of Example 1.

Example 13

A pressure-sensitive adhesive layer-attached polarizing plate was prepared as in Example 1, except that the amount of butyl acrylate was changed from 785 parts to 790 parts, the amount of the phosphate group-containing monomer (Simpomer PAM-200 (trade name) manufactured by Rhodia Nicca, Ltd.) was changed from 5 parts to 0 part, and the type of the phosphate group-containing ester was changed from PHOSPHANOL SM-172 (trade name, manufactured by TOHO CHEMICAL INDUSTRY Co., Ltd.) to PHOSPHANOL BH-650 (trade name, manufactured by TOHO CHEMICAL INDUSTRY Co., Ltd.) in the (Preparation of monomer emulsion) of Example 1.

Example 14

A pressure-sensitive adhesive layer-attached polarizing plate was prepared as in Example 1, except that the amount of butyl acrylate was changed from 785 parts to 780 parts, the amount of the phosphate group-containing monomer (Simpomer PAM-200 (trade name) manufactured by Rhodia Nicca, Ltd.) was changed from 5 parts to 10 parts, and the type of the phosphate group-containing ester was changed from PHOSPHANOL SM-172 (trade name, manufactured by TOHO CHEMICAL INDUSTRY Co., Ltd.) to PHOSPHANOL BH-650 (trade name, manufactured by TOHO CHEMICAL INDUSTRY Co., Ltd.) in the (Preparation of monomer emulsion) of Example 1.

Example 15

A pressure-sensitive adhesive layer-attached polarizing plate was prepared as in Example 1, except that the amount of butyl acrylate was changed from 785 parts to 780 parts, the amount of the phosphate group-containing monomer (Sipomer PAM-200 (trade name) manufactured by Rhodia Nicca, Ltd.) was changed from 5 parts to 10 parts, and the type of the phosphate group-containing ester was changed from PHOSPHANOL SM-172 (trade name, manufactured by TOHO CHEMICAL INDUSTRY Co., Ltd.) to PHOSPHANOL RS-710 (trade name, manufactured by TOHO CHEMICAL INDUSTRY Co., Ltd.) in the (Preparation of monomer emulsion) of Example 1.

Example 16

(Preparation of Monomer Emulsion (1))
A vessel was charged with 180 parts of butyl acrylate, 800 parts of methyl methacrylate, 20 parts of acrylic acid, 0.5 parts of 3-methacryloyloxypropyltriethoxysilane (KBM-503 (trade name) manufactured by Shin-Etsu Chemical Co., Ltd.), 75 parts of ELEMINOL JS-20 (manufactured by Sanyo Chemical Industries, Ltd.), and 4,150 parts of water as raw materials. Using a homomixer (manufactured by PRIMIX Corporation), the raw materials were stirred at 6,000 rpm for 5 minutes to form a monomer emulsion (1).

(Preparation of Monomer Emulsion (2))
A vessel was charged with 917.5 parts of butyl acrylate, 25 parts of a phosphate group-containing monomer (Sipomer PAM-200 (trade name) manufactured by Rhodia Nicca, Ltd.), 1.25 parts of a phosphate group-containing ester (PHOSPHANOL SM-172 (trade name) manufactured by TOHO CHEMICAL INDUSTRY Co., Ltd.), 57.5 parts of acrylic acid, 0.5 parts of 3-methacryloyloxypropyltriethoxysilane (KBM-503 (trade name) manufactured by Shin-Etsu Chemical Co., Ltd.), 6.25 parts of ELEMINOL JS-20 (manufactured by Sanyo Chemical Industries, Ltd.), and 1,080 parts of water as raw materials. Using a homomixer (manufactured by PRIMIX Corporation), the raw materials were stirred at 6,000 rpm for 5 minutes to form a monomer emulsion (2).

(Preparation of Aqueous Dispersion-Type Acrylic Pressure-Sensitive Adhesive)
Subsequently, 860 parts of the monomer emulsion (1) prepared as described above was added to a reaction vessel equipped with a condenser tube, a nitrogen introducing tube, a thermometer, a dropping funnel, and a stirring blade.

Subsequently, after the reaction vessel was sufficiently purged with nitrogen, the temperature of the inner bath was adjusted to 65° C. After 0.1 parts of sodium ammonium peroxosulfate (APS) was added to the reaction vessel, the mixture was subjected to polymerization for 2 hours. Subsequently, after 0.5 parts of sodium ammonium peroxosulfate (APS) was added to the reaction vessel, 1,643 parts of the monomer emulsion (2) was added dropwise to the reaction vessel over 3 hours while the temperature of the inner bath was kept at 65° C. The mixture was further subjected to polymerization for 3 hours to form an aqueous dispersion (emulsion) with a solid concentration of 40%. An aqueous dispersion-type acrylic pressure-sensitive adhesive was prepared by adding 3 parts of 10% ammonia water to 100 parts by weight of the aqueous dispersion (emulsion).

(Formation of Pressure-Sensitive Adhesive Layer for Optical Film)

The aqueous dispersion-type acrylic pressure-sensitive adhesive was applied to a release film (Diafoil MRF-38 (trade name for a polyethylene terephthalate substrate) manufactured by Mitsubishi Plastics, Inc.) with an applicator so that a 25-µm-thick coating would be formed after drying. The coating was then dried at 150° C. for 10 minutes in a hot air circulating oven to form a pressure-sensitive adhesive layer for an optical film.

(Preparation of Pressure-Sensitive Adhesive Layer-Attached Polarizing Plate)

A pressure-sensitive adhesive layer-attached polarizing plate was prepared as in Example 1, except that the pressure-sensitive adhesive layer obtained as described above for an optical film was used instead in the (Preparation of pressure-sensitive adhesive layer-attached polarizing plate) of Example 1.

Example 17

A pressure-sensitive adhesive layer-attached polarizing plate was prepared as in Example 16, except that the amount of butyl acrylate was changed from 917.5 parts to 942.5 parts and the amount of the phosphate group-containing monomer (Sipomer PAM-200 (trade name) manufactured by Rhodia Nicca, Ltd.) was changed from 25 parts to 0 parts in the (Preparation of monomer emulsion (2)) of Example 16.

Example 18

A pressure-sensitive adhesive layer-attached polarizing plate was prepared as in Example 16, except that the amount of butyl acrylate was changed from 917.5 parts to 930 parts, the amount of the phosphate group-containing monomer (Sipomer PAM-200 (trade name) manufactured by Rhodia Nicca, Ltd.) was changed from 25 parts to 12.5 parts, and the type of the phosphate group-containing ester was changed from PHOSPHANOL SM-172 (trade name, manufactured by TOHO CHEMICAL INDUSTRY Co., Ltd.) to MP-4 (trade name, manufactured by DAIHACHI CHEMICAL INDUSTRY CO., LTD.) in the (Preparation of monomer emulsion (2)) of Example 16.

Example 19

A pressure-sensitive adhesive layer-attached polarizing plate was prepared as in Example 16 (Preparation of monomer emulsion (2)), except that the type of the phosphate group-containing ester was changed from PHOSPHANOL SM-172 (trade name, manufactured by TOHO CHEMICAL INDUSTRY Co., Ltd.) to MP-4 (trade name, manufactured by DAIHACHI CHEMICAL INDUSTRY CO., LTD.) in the preparation of the monomer emulsion (2).

Example 20

(Preparation of Pressure-Sensitive Adhesive Solution)

A four-neck flask equipped with a stirring blade, a thermometer, a nitrogen gas introducing tube, and a condenser was charged with a monomer mixture including 944 parts of butyl acrylate, 50 parts of acrylic acid, 5 parts of a phosphate group-containing monomer (Sipomer PAM-200 (trade name) manufactured by Rhodia Nicca, Ltd.), and 1 part of 2-hydroxyethyl acrylate. Based on 100 parts (on a solid basis) of the monomer mixture, 0.2 parts by weight of 2,2'-azobisisobutyronitrile as a polymerization initiator and 133 parts by weight of ethyl acetate as a polymerization solvent were added to the monomer mixture. Nitrogen gas was introduced to replace the air in the flask while the mixture was gently stirred. The mixture was then subjected to a polymerization reaction for 7 hours while the temperature of the liquid in the flask was kept at around 60° C., so that a solution of an acryl-based polymer was obtained with a solid concentration of 30%. Based on 100 parts of the solid of the resulting polymer, 0.6 parts of an isocyanate group-containing compound (CORONATE L (trade name) manufactured by Nippon Polyurethane Industry Co., Ltd.), 0.075 parts of a silane coupling agent (KBM-403 (trade name) manufactured by Shin-Etsu Chemical Co., Ltd.), 0.1 parts of a phosphate group-containing ester (PHOSPHANOL SM-172 (trade name, manufactured by TOHO CHEMICAL INDUSTRY Co., Ltd.), and a solvent (ethyl acetate) for adjusting viscosity were added to the acryl-based polymer solution to form a pressure-sensitive adhesive solution (solid content 11%).

(Formation of Pressure-Sensitive Adhesive Layer for Optical Film)

The pressure-sensitive adhesive solution was applied to a release film (Diafoil MRF-38 (trade name for a polyethylene terephthalate substrate) manufactured by Mitsubishi Plastics, Inc.) by reverse roll coating so that a 25-µm-thick coating would be formed after drying. The coating was then dried at 130° C. for 3 minutes in a hot air circulating oven to form a pressure-sensitive adhesive layer for an optical film.

(Preparation of Pressure-Sensitive Adhesive Layer-Attached Polarizing Plate)

A pressure-sensitive adhesive layer-attached polarizing plate was prepared as in Example 1, except that the pressure-sensitive adhesive layer obtained as described above for an optical film was used instead in the (Preparation of pressure-sensitive adhesive layer-attached polarizing plate) of Example 1.

Example 21

A pressure-sensitive adhesive layer-attached polarizing plate was prepared as in Example 20, except that in the (Preparation of pressure-sensitive adhesive layer-attached polarizing plate), the double-side-protected polarizing plate (1) obtained in Example 2 was used instead and the pressure-sensitive adhesive layer obtained in the (Formation of pressure-sensitive adhesive layer for optical film) was bonded to the 40-µm-thick protective film on the polarizer of the double-side-protected polarizing plate.

Example 22

A pressure-sensitive adhesive layer-attached polarizing plate was prepared as in Example 20, except that the phosphate group-containing ester was changed from PHOSPHANOL SM-172 (trade name) manufactured by TOHO Chemical Industry Co., Ltd. to PHOSPHANOL GF-185 (trade name) manufactured by TOHO Chemical Industry Co., Ltd in the preparation of the aqueous dispersion.

Example 23

A pressure-sensitive adhesive layer-attached polarizing plate was prepared as in Example 20, except that the phosphate group-containing ester was changed from PHOSPHANOL SM-172 (trade name) manufactured by TOHO Chemical Industry Co., Ltd. to PHOSPHANOL BH-650 (trade name) manufactured by TOHO Chemical Industry Co., Ltd in the preparation of the aqueous dispersion.

Example 24

A pressure-sensitive adhesive layer-attached polarizing plate was prepared as in Example 20, except that the amount of butyl acrylate was changed from 944 parts to 949 parts, the amount of the phosphate group-containing monomer (Sipomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 0.1 parts to 0.03 parts.

Example 25

A pressure-sensitive adhesive layer-attached polarizing plate was prepared as in Example 20, except that the amount of butyl acrylate was changed from 944 parts to 949 parts, the amount of the phosphate group-containing monomer (Simpomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 0.1 parts to 1 part.

Example 26

A pressure-sensitive adhesive layer-attached polarizing plate was prepared as in Example 20, except that the amount of butyl acrylate was changed from 944 parts to 949 parts, the amount of the phosphate group-containing monomer (Simpomer PAM-200 (trade name) manufactured by Rhodia Nicca, Ltd.) was changed from 5 parts to 0 parts, and the type of the phosphate group-containing ester was changed from PHOSPHANOL SM-172 (trade name, manufactured by TOHO CHEMICAL INDUSTRY Co., Ltd.) to MP-4 (trade name, manufactured by DAIHACHI CHEMICAL INDUSTRY CO., LTD.).

Comparative Example 1

A pressure-sensitive adhesive layer-attached polarizing plate was prepared as in Example 1, except that the amount of butyl acrylate was changed from 785 parts to 790 parts, the amount of the phosphate group-containing monomer (Sipomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 1 part to 0 parts in the (Preparation of monomer emulsion) of Example 1.

Comparative Example 2

A pressure-sensitive adhesive layer for an optical film was formed using the same composition as in Comparative Example 1. A pressure-sensitive adhesive layer-attached polarizing plate was prepared by bonding the resulting pressure-sensitive adhesive layer for an optical film to the 40-μm-thick protective film of the double-side-protected polarizing plate (1) obtained in Example 2.

Comparative Example 3

A pressure-sensitive adhesive layer-attached polarizing plate was prepared as in Example 1, except that the amount of butyl acrylate was changed from 785 parts to 770 parts, the amount of the phosphate group-containing monomer (Sipomer PAM-200 (trade name) manufactured by Rhodia Nicca, Ltd.) was changed from 5 parts to 20 parts, and the amount of the phosphate group-containing ester (PHOSPHANOL SM-172 (trade name) manufactured by TOHO CHEMICAL INDUSTRY Co., Ltd.) was changed from 1 part to 0 parts in the (Preparation of monomer emulsion) of Example 1.

Comparative Example 4

A pressure-sensitive adhesive layer-attached polarizing plate was prepared as in Example 1, except that the amount of butyl acrylate was changed from 785 parts to 740 parts, the amount of the phosphate group-containing monomer (Simpomer PAM-200 (trade name) manufactured by Rhodia Nicca, Ltd.) was changed from 5 parts to 50 parts, and the amount of the phosphate group-containing ester (PHOSPHANOL SM-172 (trade name) manufactured by TOHO CHEMICAL INDUSTRY Co., Ltd.) was changed from 1 part to 0 parts in the (Preparation of monomer emulsion) of Example 1.

Comparative Example 5

A pressure-sensitive adhesive layer-attached polarizing plate was prepared as in Example 20, except that the amount of butyl acrylate was changed from 944 parts to 949 parts, the amount of the phosphate group-containing monomer (Sipomer PAM-200 (trade name) manufactured by Rhodia Nicca, Ltd.) was changed from 5 parts to 0 parts, and the amount of the phosphate group-containing ester (PHOSPHANOL SM-172 (trade name) manufactured by TOHO CHEMICAL INDUSTRY Co., Ltd.) was changed from 0.1 parts to 0 parts.

The pressure-sensitive adhesive layer obtained in each of the examples and the comparative examples for an optical film was evaluated for thickness and corrosion resistance. Tables 1 and 2 show the results.

<Corrosion Resistance for Crystalline ITO Thin Coating>

A thermosetting resin composed of a melamine resin, an alkyd resin, and an organosilane condensate (2:2:1 in weight ratio) was used to form a 180-nm-thick first undercoat layer on one surface of a 25-μm-thick polyethylene terephthalate film (hereinafter referred to as a PET film). $SiO_2$ was then vacuum-deposited on the first undercoat layer by electron-beam heating at a degree of vacuum of $1.33 \times 10^{-2}$ to $2.67 \times 10^{-2}$ Pa to form a 40-nm-thick second undercoat layer ($SiO_2$ film).

A 22-nm-thick ITO coating was then formed on the second undercoat layer by reactive sputtering in a $5.33 \times 10^{-2}$ Pa atmosphere of 80% argon gas and 20% oxygen gas using a material of 90% by weight of indium oxide and 10% by weight of tin oxide, so that an ITO thin coating-attached film was obtained. The resulting ITO coating was amorphous. The ITO thin coating-attached film was crystallized by heat treatment at 140° C. for 90 minutes, so that a crystallized ITO thin coating was obtained.

A piece of 8 mm×8 mm was cut from the pressure-sensitive adhesive layer-attached polarizing plate obtained in each of the examples and the comparative examples. Each sample was prepared by placing the surface of the pressure-sensitive adhesive layer of each cut piece on the crystallized ITO coating of the ITO thin coating-attached film (15 mm×15 mm). In each sample, the resistance of the crystallized ITO coating of the ITO thin coating-attached film was measured with a Hall effect measurement system (HL5500PC (product name) manufactured by Nanometrics Incorporated) (the measured resistance is called the pre-test resistance). Each sample was then allowed to stand for 500 hours in an atmosphere at 60° C. and 95% RH. After the standing, the resistance of the crystallized ITO coating of the ITO thin coating-attached film in each sample was measured in the same way (it is called the post-test resistance). Using the measurement results, the rate of increase in the resistance between before and after each sample was allowed to stand in the above atmosphere was calculated from the following formula.

The rate (%) of increase in the resistance=(the post-test resistance/the pre-test resistance)×100

The lower the rate of increase in the resistance, the better the result. If the rate of increase in the resistance is 120% or less, then it will be determined that a satisfactory level of corrosion resistance is achieved. The evaluation is performed according to the following criteria.

○: The rate of increase in the resistance is 120% or less.
x: The rate of increase in the resistance is more than 120%.

<Corrosion Resistance for Amorphous ITO Thin Coating>

ELECRYSTA P400L-TNME manufactured by Nitto Denko Corporation was used, which was a film having a 22-nm-thick amorphous ITO thin coating. The film having the amorphous ITO thin coating was heat-treated at 140° C. for 90 minutes before subjected to an evaluation test. After the treatment, the ITO thin coating of the film was amorphous.

A piece of 8 mm×8 mm was cut from the pressure-sensitive adhesive layer-attached polarizing plate obtained in each of Examples 1, 9, 16, 18, and 20 and Comparative Examples 1 and 5. Each sample was prepared by placing the surface of the pressure-sensitive adhesive layer of each cut piece on the amorphous ITO coating of the ITO thin coating-attached film. In each sample, the resistance of the amorphous ITO coating of the ITO thin coating-attached film was measured with a Hall effect measurement system (HL5500PC (product name) manufactured by Nanometrics Incorporated) (the measured resistance is called the pre-test resistance). Each sample was then allowed to stand for 500 hours in an atmosphere at 60° C. and 95% RH. After the standing, the resistance of the ITO coating of the amorphous ITO thin coating-attached film in each sample was measured in the same way (it is called the post-test resistance). Using the measurement results, the rate of increase in the resistance between before and after each sample was allowed to stand in the above atmosphere was calculated from the following formula.

The rate (%) of increase in the resistance=(the post-test resistance/the pre-test resistance)×100

The lower the rate of increase in the resistance, the better the result. If the rate of increase in the resistance is 130% or less, then it will be determined that a satisfactory level of corrosion resistance is achieved.

○: The rate of increase in the resistance is 130% or less.
x: The rate of increase in the resistance is more than 130%.

TABLE 1

| | Acrylic pressure-sensitive adhesive layer | | | | | Corrosion resistance for crystalline ITO thin coating | |
|---|---|---|---|---|---|---|---|
| | | | Phosphate group-containing components (wt parts) | | Protective film of polarizing plate on pressure-sensitive | | |
| | Dispersion medium | Structure | Monomer Amount | Ester Type | Amount | adhesive layer side Thickness (μm) | Rate (%) of change | Evaluation |
| Example 1 | Aqueous dispersion type | Uniform structure | 0.5 | SM-172 | 0.1 | 0 | 103 | ○ |
| Example 2 | | | 0.5 | SM-172 | 0.1 | 40 | 102 | ○ |
| Example 3 | | | 0.5 | SM-172 | 1 | 0 | 105 | ○ |
| Example 4 | | | 0 | SM-172 | 0.2 | 0 | 118 | ○ |
| Example 5 | | | 0 | SM-172 | 1 | 0 | 117 | ○ |
| Example 6 | | | 2 | SM-172 | 0.03 | 0 | 109 | ○ |
| Example 7 | | | 2 | SM-172 | 1 | 0 | 109 | ○ |
| Example 8 | | | 5 | SM-172 | 0.1 | 0 | 112 | ○ |
| Example 9 | | | 1 | MP-4 | 0.1 | 0 | 102 | ○ |
| Example 10 | | | 2 | MP-4 | 0.1 | 0 | 103 | ○ |
| Example 11 | | | 0 | GP-185 | 0.1 | 0 | 119 | ○ |
| Example 12 | | | 1 | GP-185 | 0.1 | 0 | 103 | ○ |
| Example 13 | | | 0 | PH-650 | 0.1 | 0 | 118 | ○ |
| Example 14 | | | 1 | BH-650 | 0.1 | 0 | 103 | ○ |
| Example 15 | | | 1 | RS-710 | 0.1 | 0 | 111 | ○ |
| Example 16 | | Core-shell structure | 2 | SM-172 | 0.1 | 0 | 103 | ○ |
| Example 17 | | | 0 | SM-172 | 0.1 | 0 | 109 | ○ |
| Example 18 | | | 1 | MP-4 | 0.1 | 0 | 102 | ○ |
| Example 19 | | | 2 | MP-4 | 0.1 | 0 | 102 | ○ |

TABLE 1-continued

| | Acrylic pressure-sensitive adhesive layer | | | | | Protective film of polarizing plate on pressure-sensitive adhesive layer side | Corrosion resistance for crystalline ITO thin coating | |
|---|---|---|---|---|---|---|---|---|
| | Dispersion | | Phosphate group-containing components (wt parts) | | | | | |
| | | | Monomer | Ester | | | | |
| | medium | Structure | Amount | Type | Amount | Thickness (μm) | Rate (%) of change | Evaluation |
| Example 20 | Solvent type | — | 0.5 | SM-172 | 0.1 | 0 | 103 | ○ |
| Example 21 | | | 0.5 | SM-172 | 0.1 | 40 | 102 | ○ |
| Example 22 | | | 0.5 | GF-185 | 0.1 | 0 | 102 | ○ |
| Example 23 | | | 0.5 | BM-650 | 0.1 | 0 | 104 | ○ |
| Example 24 | | | 0 | SM-172 | 0.03 | 0 | 111 | ○ |
| Example 25 | | | 0 | SM-172 | 1 | 0 | 109 | ○ |
| Example 26 | | | 0 | MP-4 | 0.1 | 0 | 103 | ○ |
| Comparative Example 1 | | | 0 | — | 0 | 0 | 317 | X |
| Comparative Example 2 | Aqueous dispersion type | Uniform structure | 0 | — | 0 | 40 | 287 | X |
| Comparative Example 3 | | | 0 | — | 0 | 0 | 131 | X |
| Comparative Example 4 | | | 0 | — | 0 | 0 | 144 | X |
| Comparative Example 5 | Solvent type | — | 0 | — | 0 | 0 | 130 | X |

TABLE 2

| | Acrylic pressure-sensitive adhesive layer | | | | | Protective film of polarizing plate on pressure-sensitive adhesive layer side | Corrosion resistance for amorphous ITO thin coating | |
|---|---|---|---|---|---|---|---|---|
| | Dispersion | | Phosphate group-containing components (wt parts) | | | | | |
| | | | Monomer | Ester | | | | |
| | medium | Structure | Amount | Type | Amount | Thickness (μm) | Rate (%) of change | Evaluation |
| Example 1 | Aqueous dispersion type | Uniform structure | 0.5 | SM-172 | 0.1 | 0 | 124 | ○ |
| Example 9 | | | 1 | MP-4 | 0.1 | 0 | 114 | ○ |
| Example 16 | | Core-shell structure | 2 | SM-172 | 0.1 | 0 | 128 | ○ |
| Example 18 | | | 1 | MP-4 | 0.1 | 0 | 114 | ○ |
| Example 20 | Solvent type | — | 0.5 | SM-172 | 0.1 | 0 | 123 | ○ |
| Comparative Example 1 | Aqueous dispersion type | Uniform structure | 0 | — | 0 | 0 | 717 | X |
| Comparative Example 5 | Solvent type | | 0 | — | 0 | 0 | 429 | X |

In Tables 1 and 2, the abbreviations have the following meanings.

SM-172: PHOSPHANOL SM-172 (manufactured by TOHO CHEMICAL INDUSTRY Co., Ltd.)

GF-185: PHOSPHANOL GF-185 (manufactured by TOHO CHEMICAL INDUSTRY Co., Ltd.)

BH-650: PHOSPHANOL BH-650 (manufactured by TOHO CHEMICAL INDUSTRY Co., Ltd.)

RS-710: PHOSPHANOL RS-710 (manufactured by TOHO CHEMICAL INDUSTRY Co., Ltd.)

MP-4: MP-4 (trade name) manufactured by DAIHACHI CHEMICAL INDUSTRY CO., LTD.

In Tables 1 and 2, the amount (wt parts) is based on 100 parts by weight of the monomer component, except that the amount (wt parts) of the ester in Examples 20 to 26 is based on 100 parts by weight of the solid of the (meth)acryl-based polymer.

DESCRIPTION OF REFERENCE SIGNS

In the drawings, reference sign 1 represents an optical film, 2 a pressure-sensitive adhesive layer for an optical film, 3 a transparent conductive layer, 4 a liquid crystal cell, 5 a pressure-sensitive adhesive layer, and 6 an optical film.

The invention claimed is:

1. A laminate comprising:
    a pressure-sensitive adhesive layer-attached optical film; and
    a transparent conductive film having a transparent conductive layer,
    wherein the pressure-sensitive adhesive layer-attached optical film comprises
        an optical film; and
        a pressure-sensitive adhesive layer provided on at least one surface of the optical film,
    wherein the optical film comprises a polarizing plate comprising iodine, wherein the polarizing plate comprises a polarizer and a protective film provided on one surface of the polarizer, and the pressure-sensitive adhesive layer is in contact with at least another surface of the polarizer, on which the protective film is not provided, wherein the transparent conductive layer of the transparent conductive film is in direct contact with the pressure-sensitive adhesive layer of the pressure-sensitive adhesive layer-attached optical film, wherein the pressure-sensitive adhesive layer is made from a pressure-sensitive adhesive composition comprising
- a (meth)acryl-based polymer obtained by polymerization of a monomer component comprising, as a main component, an alkyl (meth)acrylate having an alkyl group of 4 to 18 carbon atoms; and
- a phosphate ester compound, and wherein the pressure-sensitive adhesive composition comprises 0.005 to 0.2 parts by weight of the phosphate ester compound based on 100 parts by weight of the total amount of the monomer component used to form the (meth)acryl-based polymer.

2. The laminate according to claim 1, wherein the monomer component further comprises a phosphate group-containing monomer.

3. The laminate according to claim 2, wherein the content of the phosphate group-containing monomer is from 0.1 to 10 parts by weight based on 100 parts by weight of the total amount of the monomer component used to form the (meth)acryl-based polymer.

4. A liquid crystal display device comprising the laminate according to claim 1.

* * * * *